(12) United States Patent
Saito et al.

(10) Patent No.: US 12,374,904 B2
(45) Date of Patent: Jul. 29, 2025

(54) CONTROL SYSTEM FOR ALTERNATELY DISCHARGING BATTERY PACKS OF A POWER SYSTEM

(71) Applicant: SoftBank Corp., Tokyo (JP)

(72) Inventors: Takaya Saito, Tokyo (JP); Yoshiki Takayanagi, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/970,932

(22) Filed: Dec. 6, 2024

(65) Prior Publication Data

US 2025/0096580 A1 Mar. 20, 2025

Related U.S. Application Data

(63) Continuation of application No. PCT/JP2023/030617, filed on Aug. 24, 2023.

(30) Foreign Application Priority Data

Oct. 13, 2022 (JP) .................................. 2022-164496

(51) Int. Cl.
  *H02J 7/00* (2006.01)
  *H02J 7/34* (2006.01)
  *H02J 7/35* (2006.01)

(52) U.S. Cl.
  CPC ........ *H02J 7/0019* (2013.01); *H02J 7/00308* (2020.01); *H02J 7/0031* (2013.01);
  (Continued)

(58) Field of Classification Search
  CPC .................................................. H02J 7/0019
  (Continued)

(56) References Cited

U.S. PATENT DOCUMENTS

| 2014/0062420 A1* | 3/2014 | Someya ................ H02J 7/0019 320/166 |
| 2018/0131198 A1* | 5/2018 | Liu ........................ H02J 7/0018 |

(Continued)

FOREIGN PATENT DOCUMENTS

| JP | H09312172 A | 12/1997 |
| JP | 2008125199 A | 5/2008 |

(Continued)

OTHER PUBLICATIONS

International Search Report and Written Opinion (ISA/237) of the International Search Authority for International Patent Application No. PCT/JP2023/030617, mailed by the Japan Patent Office on Nov. 14, 2023.

(Continued)

*Primary Examiner* — Jerry D Robbins

(57) ABSTRACT

There is provided a system including a plurality of switching units connected in parallel to a bus to which a power generation unit and a load are connected, each of the plurality of switching units switching ON/OFF of a connection of a battery pack to the bus; a plurality of battery packs individually connected to each of the plurality of switching units, each of the plurality of battery packs being identical to the battery pack; and a management unit which manages the plurality of switching units such that the plurality of battery packs are alternately discharged so that a discharging rate of each of the plurality of battery packs is increased compared to when all of the plurality of battery packs are discharged.

20 Claims, 16 Drawing Sheets

(52) U.S. Cl.
CPC ...... *H02J 7/0068* (2013.01); *H02J 7/007182* (2020.01); *H02J 7/342* (2020.01); *H02J 7/35* (2013.01)

(58) Field of Classification Search
USPC ......................................................... 320/125
See application file for complete search history.

(56) References Cited

U.S. PATENT DOCUMENTS

| | | | |
|---|---|---|---|
| 2019/0044348 A1* | 2/2019 | Maruyama | H02J 7/007192 |
| 2019/0207396 A1* | 7/2019 | Chen | H02J 7/0016 |
| 2021/0091576 A1* | 3/2021 | Zhang | H02J 7/00045 |
| 2021/0091848 A1 | 3/2021 | Cai | |
| 2021/0234380 A1* | 7/2021 | Ono | H01M 10/441 |
| 2023/0044238 A1 | 2/2023 | Saito | |
| 2023/0208170 A1* | 6/2023 | Kim | H01M 10/482 320/107 |

FOREIGN PATENT DOCUMENTS

| | | |
|---|---|---|
| JP | 2013153545 A | 8/2013 |
| JP | 2020043494 A | 3/2020 |
| JP | 2021166436 A | 10/2021 |
| WO | 2016121072 A1 | 8/2016 |
| WO | 2022136414 A1 | 6/2022 |

OTHER PUBLICATIONS

Office Action issued for counterpart Japanese Application No. 2022-164496, transmitted from the Japanese Patent Office on Jan. 9, 2024 (drafted on Dec. 27, 2023).

Decision to Grant a Patent issued for counterpart Japanese Application No. 2022-164496, transmitted from the Japanese Patent Office on May 21, 2024 (drafted on May 13, 2024).

Office Action issued for counterpart Chinese Application 202380059976.3, issued by The State Intellectual Property Office of People's Republic of China on May 15, 2025.

* cited by examiner

CONTROL SYSTEM FOR ALTERNATELY DISCHARGING BATTERY PACKS OF A POWER SYSTEM

The contents of the following patent application(s) are incorporated herein by reference:
NO. 2022-164496 filed in JP on Oct. 13, 2022
NO. PCT/JP2023/030617 filed in WO on Aug. 24, 2023.

BACKGROUND

1. Technical Field

The present invention relates to a system.

2. Related Art

A device that executes various operations by discharging electric power of a battery at a relatively low discharging rate such as HAPS, or High Altitude Platform Station, is known (for example, see Patent Document 1).

PRIOR ART DOCUMENT

Patent Document

Patent Document 1: Japanese Patent Application Publication No. 2020-043494

DESCRIPTION OF EXEMPLARY EMBODIMENTS

A battery, especially a battery with a lithium metal negative electrode, has a characteristic that it deteriorates rapidly when a discharging rate is low. As one solution for this, a technology has been proposed in which a plurality of battery packs are used alternately to increase the discharging rate per battery pack. Any switching unit which switches the battery packs may be adopted, as long as it is able to turn ON/OFF a connection for a battery pack, but since a characteristic varies for each switching unit to be used, it may be required to devise a way to use the switching unit depending on the characteristic. A system 10 according to the present embodiment achieves switching control which takes into account such characteristics. In addition, the system 10 according to the present embodiment achieves management of charging and discharging of a battery which takes into account the characteristic of the battery described above.

Hereinafter, the present invention will be described through embodiments of the invention, but the following embodiments are not intended to limit the invention according to the claims. In addition, not all of combinations of features described in the embodiments are essential to a solution of the invention.

Figure 1:
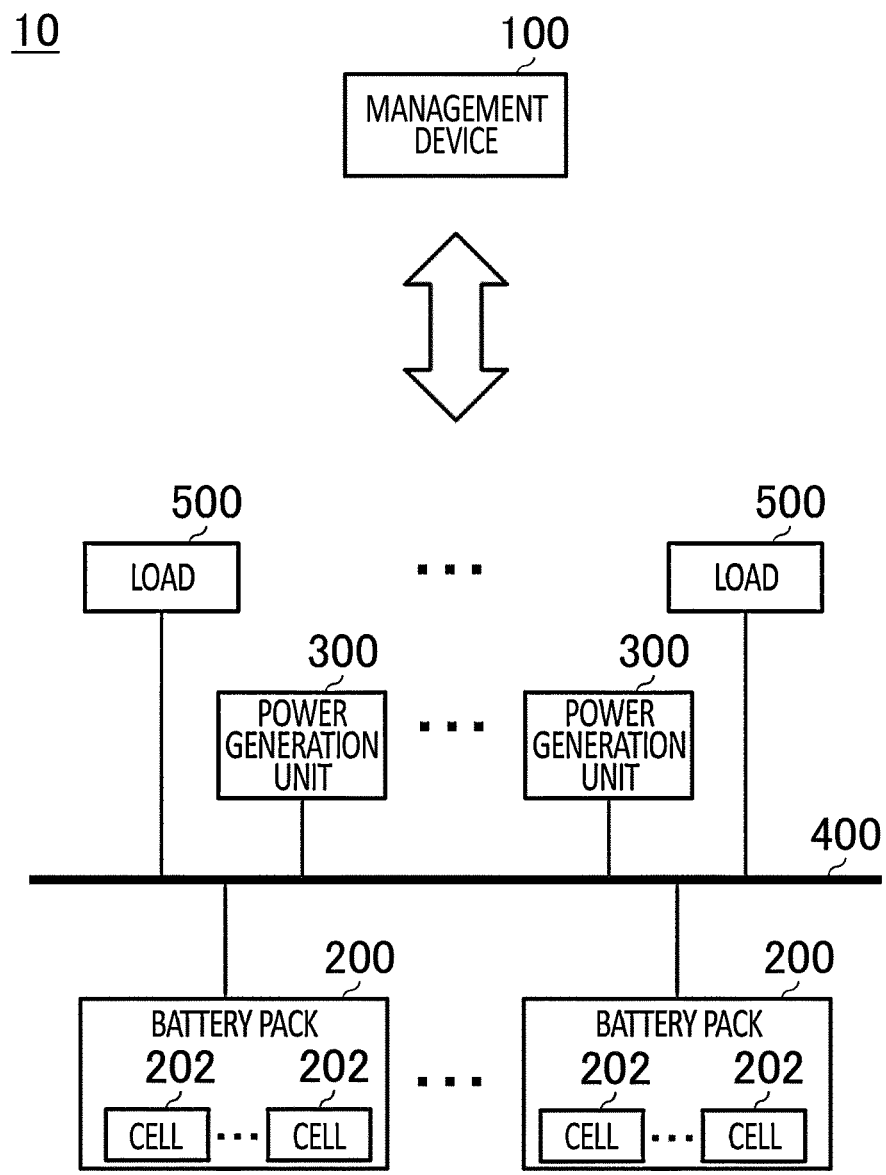
FIG. 1 schematically illustrates an example of a system 10.

FIG. 1 schematically illustrates an example of the system 10. The system 10 includes a management device 100. The management device 100 manages a plurality of battery packs 200 connected in parallel to a bus 400 to which a plurality of power generation units 300 and a plurality of loads 500 are connected. The management device 100 may manage charging and discharging of the plurality of battery packs 200.

The system 10 may include the plurality of battery packs 200. The system 10 may also include the plurality of power generation units 300. The system 10 may also include the plurality of loads 500.

A cell type of a battery pack 200 may be of any type. For example, the battery pack 200 is a cell using lithium for its negative electrode. For example, the battery pack 200 is a lithium-ion cell. The battery pack 200 may have a lithium metal cell.

The battery pack 200 includes a plurality of cells 202. For example, a cell 202 may be a battery cell using metal lithium for its negative electrode.

For example, a power generation unit 300 performs solar power generation. A power generation approach used by the power generation unit 300 may also be another power generation approach. The battery pack 200 can be charged with electric power generated by the power generation unit 300. The plurality of power generation units 300 may be connected in parallel to the bus 400.

A load 500 consumes the electric power of the battery pack 200 or consumes the electric power generated by the power generation unit 300. The load 500 may be any device which is operated by the electric power. For example, when the system 10 is installed in a flying object, the load 500 may be a device related to a flight of the flying object such as a propeller or an elevator.

The management device 100 according to the present embodiment may manage the charging and discharging of the plurality of battery packs 200 so as to suppress deterioration of the plurality of battery packs 200.

Figure 2:
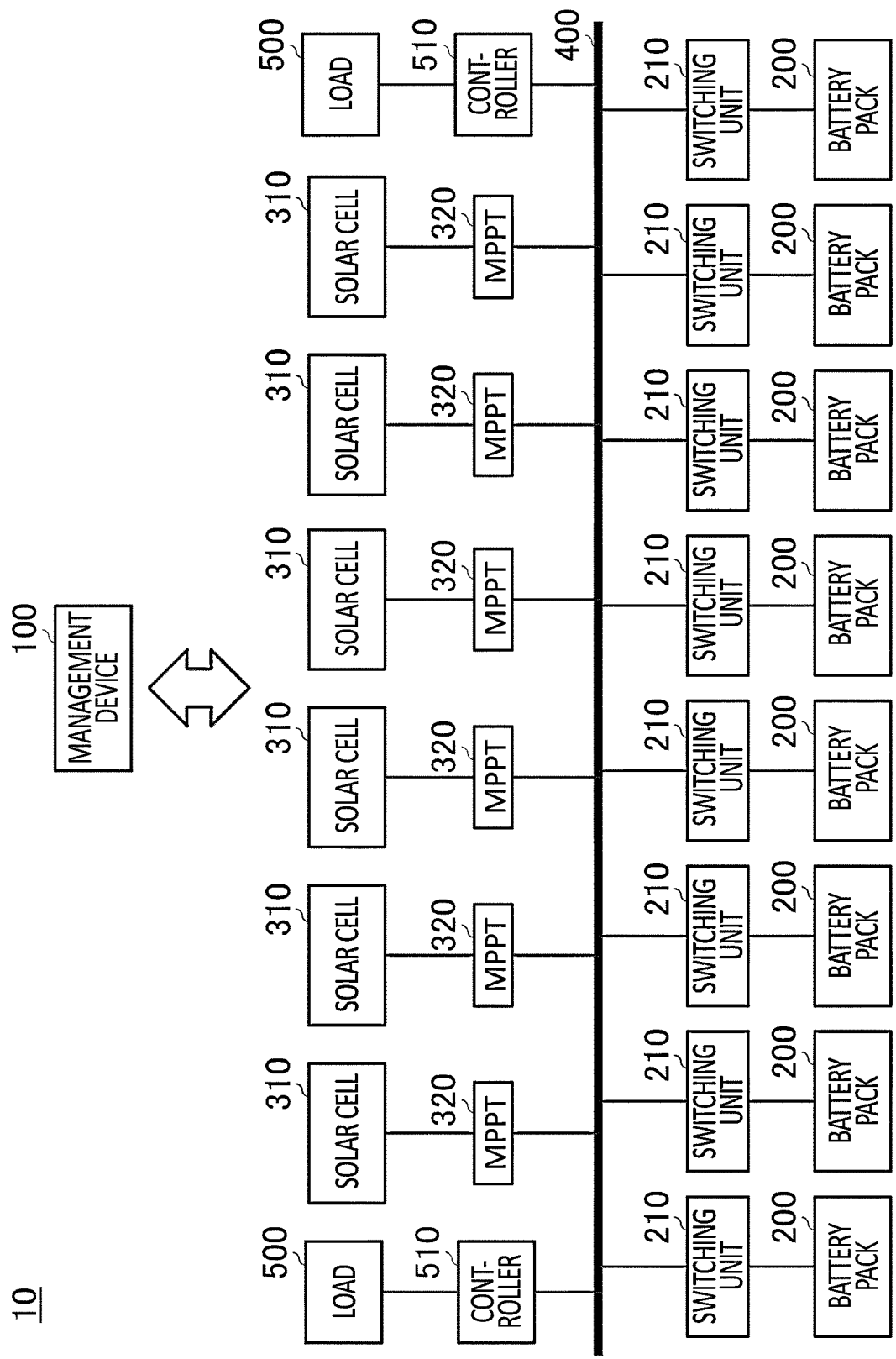
FIG. 2 schematically illustrates an example of the system 10.

FIG. 2 schematically illustrates an example of the system 10. In the example illustrated in FIG. 2, each of the plurality of battery packs 200 is connected to the bus 400 via a switching unit 210 which switches ON/OFF of a connection of the battery pack 200 to the bus 400. A plurality of switching units 210 are connected in parallel to the bus 400, and each of the plurality of switching units 210 is connected to each of the plurality of battery packs 200. In addition, a plurality of solar cells 310 are each connected to the bus 400 via an MPPT, or Maximum Power Point Tracking, 320. A solar cell 310 may be an example of the power generation unit 300. In addition, the plurality of loads 500 are each connected to the bus 400 via a controller 510. Here, a left-side load 500 arranged on a left side of the bus 400 and a right-side load 500 arranged on a right side of the bus 400 are illustrated.

When the battery packs 200 are individually described, from the left side to the right side, the battery packs 200 may be respectively referred to as a battery pack A, a battery pack B, a battery pack C, a battery pack D, a battery pack E, a battery pack F, a battery pack G, and a battery pack H. When the switching units 210 are individually described, from the left side to the right side, the switching units 210 may be respectively referred to as a switching unit A, a switching unit B, a switching unit C, a switching unit D, a switching unit E, a switching unit F, a switching unit G, and a switching unit H.

Figure 3:
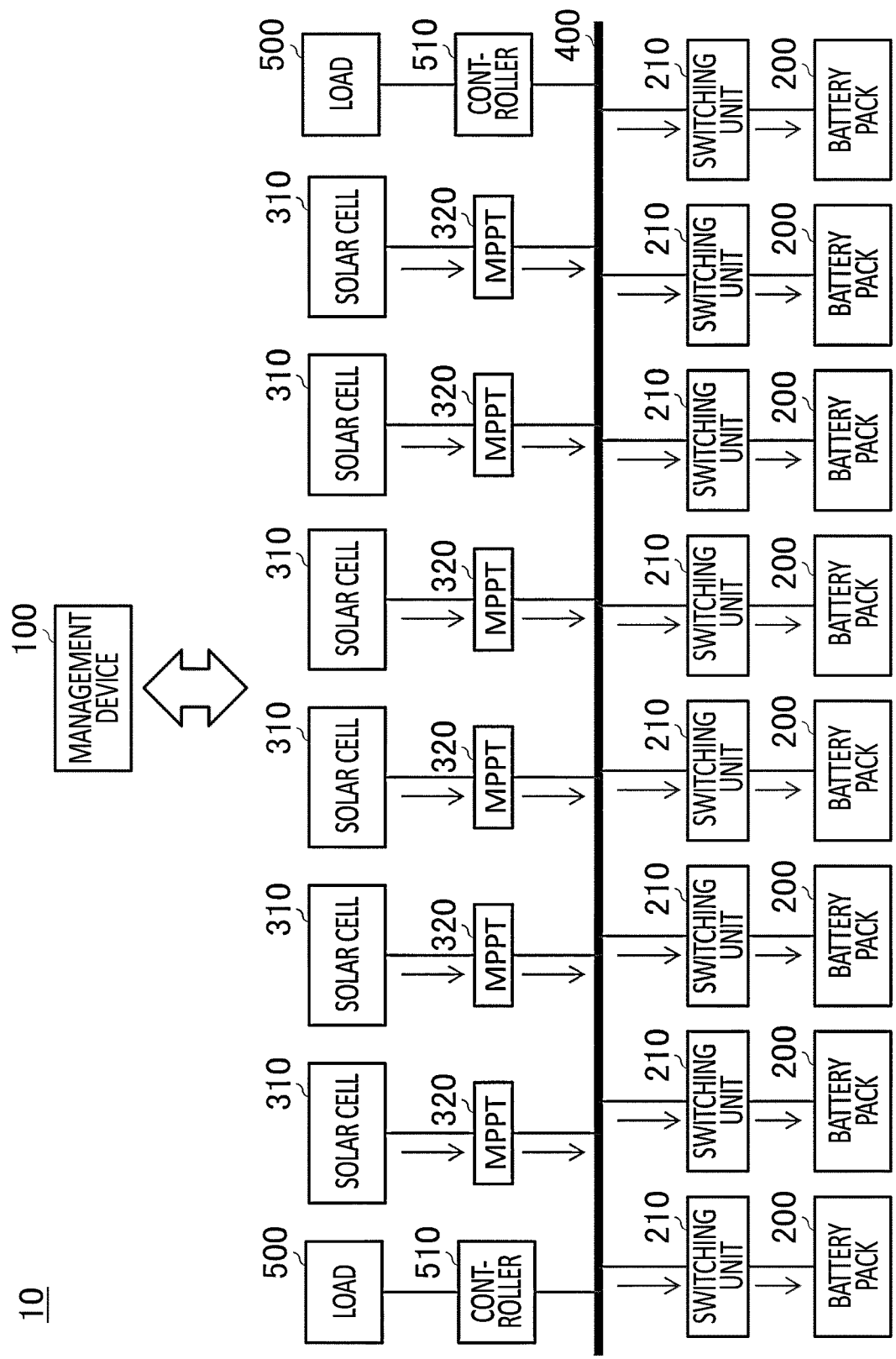
FIG. 3 schematically illustrates an example of a current flow during charging in the system 10.

FIG. 3 schematically illustrates an example of a current flow during charging in the system 10. As illustrated in the example of FIG. 3, the management device 100 may control an electrical connection of the plurality of battery packs 200 to the bus 400 such that the plurality of battery packs 200 are simultaneously charged with the electric power generated by the plurality of solar cells 310. For example, when the plurality of solar cells 310 start to generate the electric power, the management device 100 controls all the switching units 210 such that all the battery packs 200 are electrically connected to the bus 400.

Figure 4:
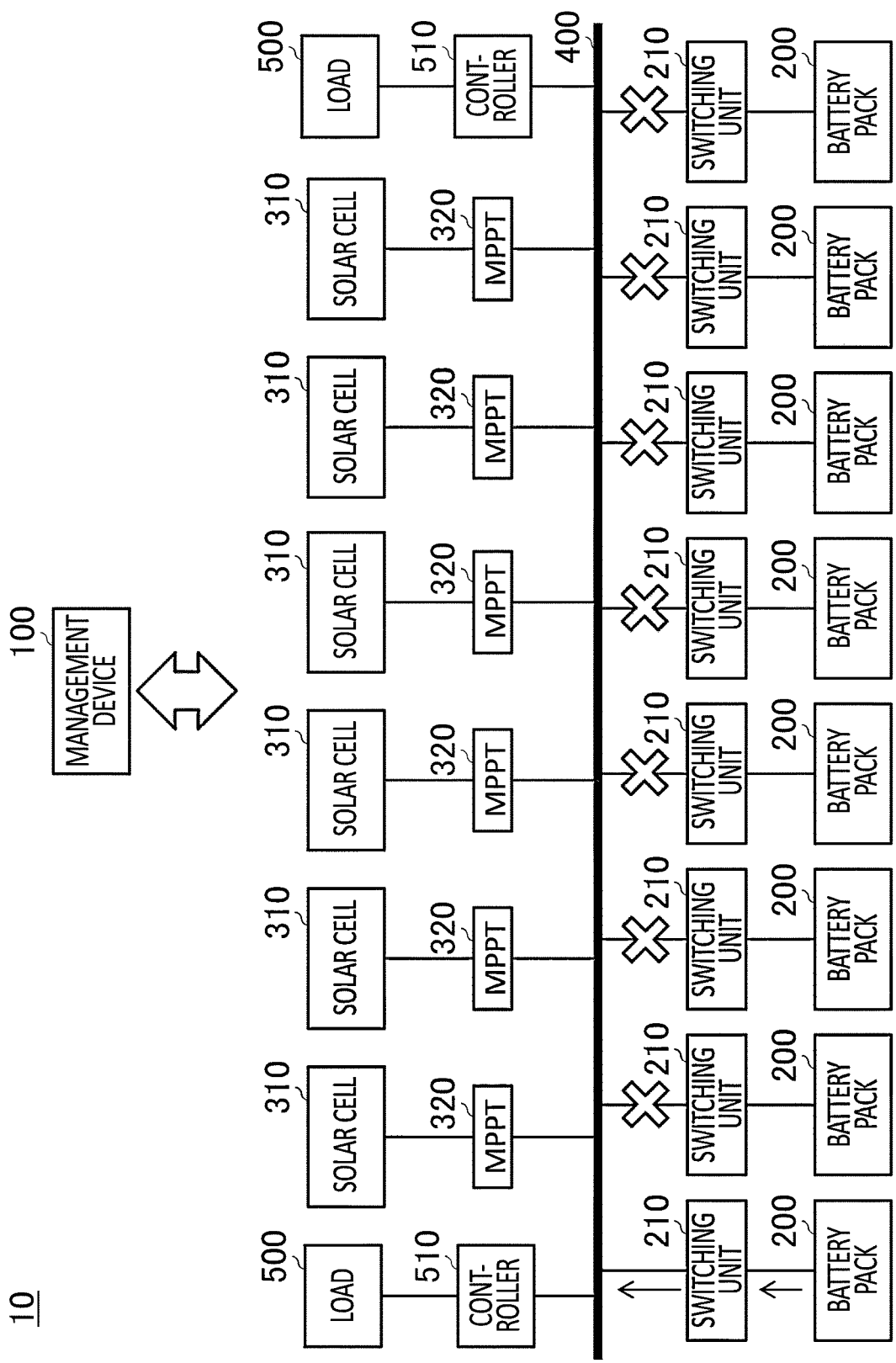
FIG. 4 schematically illustrates an example of a current flow during discharging in the system 10.

FIG. 4 schematically illustrates an example of a current flow during discharging in the system 10. The management device 100 may control the plurality of switching units 210 to alternately discharge the plurality of battery packs 200 so that the discharging rate of each of the plurality of battery packs 200 is increased compared to when all of the plurality of battery packs 200 are discharged.

For example, the management device 100 controls the plurality of switching units 210 such that each of the plurality of battery packs 200 is discharged sequentially, one at a time. For example, the management device 100 controls the plurality of switching units 210 such that the battery pack A, the battery pack B, the battery pack C, the battery pack D, the battery pack E, the battery pack F, the battery pack G and the battery pack H are discharged in this order repeatedly. Alternatively, for example, the management device 100 controls the plurality of switching units 210 such that a battery pack 200 with a higher voltage gains a higher priority among the plurality of battery packs 200 and is discharged in order of the priority. In this way, by discharging eight battery packs 200 alternately, the discharging rate of each of the battery packs 200 can be eight times higher compared to when all of the eight battery packs 200 are discharged.

Although the management device 100 switches between the charging and discharging of the plurality of battery packs 200 depending on a situation, when all the battery packs 200 are electrically connected to the bus 400 for charging, if there is a large difference in voltage between a battery pack 200 with a highest voltage and a battery pack 200 with a lowest voltage among the plurality of battery packs 200, for example, then current flows from a former to a latter to increase the charging rate of the latter, which may cause the latter to deteriorate rapidly.

The management device 100 may control the plurality of switching units 210 to alternately discharge the plurality of battery packs 200 so that the difference in voltage between the battery pack 200 with the highest voltage and the battery pack 200 with the lowest voltage among the plurality of battery packs 200 does not exceed a predetermined voltage threshold. In other words, the management device 100 may control the plurality of switching units 210 to alternately discharge the plurality of battery packs 200 so that a difference in remaining capacity between a battery pack 200 with a largest remaining capacity and a battery pack 200 with a smallest remaining capacity among the plurality of battery packs 200 does not exceed a predetermined remaining capacity threshold.

For example, the management device 100 causes the battery pack 200 with the highest voltage, which may be referred to as a first battery pack 200, to start discharging firstly among the plurality of battery packs 200. Before a difference between the voltage of the first battery pack 200 and a battery pack 200 with a highest voltage among rest of the plurality of battery packs 200 among the plurality of battery packs 200, which may be referred to as a second battery pack 200, exceeds a voltage threshold, the management device 100 causes the second battery pack 200 to start discharging. The management device 100 causes the first battery pack 200 to stop discharging after a predetermined time has passed since discharging of the second battery pack 200 was started. By repeating such control, it is possible to perform control such that the difference in voltage between the battery pack 200 with the highest voltage and the battery pack 200 with the lowest voltage among the plurality of battery packs 200 does not exceed the predetermined voltage threshold. The predetermined time may be around 0.01-1 second, for example. It is possible not to interrupt discharging by stopping the discharging of the first battery pack 200 after the predetermined time has passed since the discharging of the second battery pack 200 was started.

Figure 5:
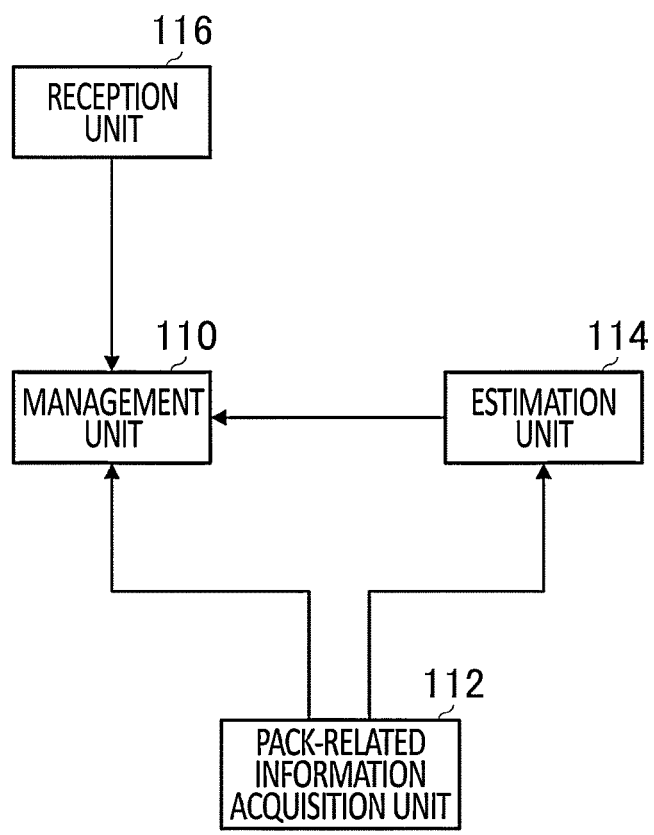
FIG. 5 schematically illustrates an example of a functional configuration of a management device 100.

FIG. 5 schematically illustrates an example of a functional configuration of the management device 100. The management device 100 may include a management unit 110, a pack-related information acquisition unit 112, an estimation unit 114, and a reception unit 116. It is not always essential that the management device 100 includes all of these.

The management unit 110 controls the plurality of switching units 210 to alternately discharge the plurality of battery packs 200 so that the discharging rate of each of the plurality of battery packs 200 is increased compared to when all of the plurality of battery packs 200 are discharged.

The management unit 110 may control the plurality of switching units 210 to alternately discharge the plurality of battery packs 200 so that the difference in voltage between the battery pack 200 with the highest voltage and the battery pack 200 with the lowest voltage among the plurality of battery packs 200 does not exceed the predetermined voltage threshold.

For example, the management unit 110 causes the battery pack 200 with the highest voltage, which may be referred to as a first battery pack 200, to start discharging firstly among the plurality of battery packs 200. Then, before a difference between the voltage of the first battery pack 200 and a battery pack 200 with a highest voltage among the rest of the plurality of battery packs 200 among the plurality of battery packs 200, which may be referred to as a second battery pack 200, exceeds the predetermined voltage threshold, the management unit 110 causes the second battery pack 200 to start discharging. The management unit 110 causes the first battery pack 200 to stop discharging after the predetermined time has passed since discharging of the second battery pack 200 was started. The management unit 110 repeats such control to cause the plurality of battery packs 200 to be sequentially discharged.

The management unit 110 may control the electrical connection of the plurality of battery packs 200 to the bus 400 such that the plurality of battery packs 200 are simultaneously charged with the electric power generated by the plurality of solar cells 310. For example, the management unit 110 controls the plurality of switching units 210 to simultaneously charge the plurality of battery packs 200 with the electric power generated by the plurality of solar cells 310.

When the plurality of battery packs 200 are charged with the electric power generated by the plurality of solar cells 310, the management unit 110 may manage a voltage from the solar cell 310 to the bus 400 such that it falls within a range between a voltage of the battery pack 200 with the highest voltage and a voltage of the battery pack 200 with the lowest voltage among the plurality of battery packs 200. The management unit 110 may manage, by controlling a plurality of MPPTs 320, the voltage from the solar cell 310 to the bus 400 such that it falls within the range between the voltage of the battery pack 200 with the highest voltage and the voltage of the battery pack 200 with the lowest voltage among the plurality of battery packs 200.

The pack-related information acquisition unit 112 acquires pack-related information related to the battery pack 200 for each of the plurality of battery packs 200. For example, the pack-related information acquisition unit 112 acquires information detected by a sensor arranged for each of the plurality of battery packs 200, as pack-related information, from the sensor.

The pack-related information may include an OCV, or Open Circuit Voltage, of the battery pack 200. The pack-related information may include a CCV, or Closed Circuit Voltage, of the battery pack 200. The pack-related information may include a DCIR, or Direct Current Internal Resistance, of the battery pack 200. The pack-related information may include an SOH, or State of Health, of the battery pack 200. The pack-related information may include an SOC, or State Of Charge, of the battery pack 200. The pack-related information may include a current value of the battery pack 200. The pack-related information may include a discharge duration of the battery pack 200. The pack-related information may include an integrated capacity of the battery pack 200. The pack-related information may include a temperature of the battery pack 200.

The estimation unit 114 estimates a state of the battery pack 200 based on the pack-related information acquired by the pack-related information acquisition unit 112. The estimation unit 114 may use an estimation method used in an existing BMS, or Battery Management System, to perform estimation.

For example, the estimation unit 114 has stored a relationship between the SOC and the DCIR of the battery pack 200 and estimates the OCV of the battery pack 200 based on the stored DCIR, the SOH, the current value, the discharge duration, the CCV, and the integrated capacity.

In addition, for example, the estimation unit 114 first estimates the SOC and the SOH before starting the discharging based on the OCV, the current value, the discharge duration, the CCV, the integrated capacity, and the temperature before starting the discharge. Then, the estimation unit 114 uses the data to estimate a current DCIR based on a pre-stored database. The estimation unit 114 estimates a current OCV based on the estimated current DCIR, the CCV, and the current value.

The management unit 110 may control the plurality of switching units 210 to alternately discharge the plurality of battery packs 200 so that the difference in voltage between the battery pack 200 with the highest voltage and the battery pack 200 with the lowest voltage among the plurality of battery packs 200 does not exceed the predetermined voltage threshold, based on the OCV of each of the plurality of battery packs 200 acquired by the pack-related information acquisition unit 112.

Alternatively, the management unit 110 may control the plurality of switching units 210 to alternately discharge the plurality of battery packs 200 so that the difference in voltage between the battery pack 200 with the highest voltage and the battery pack 200 with lowest voltage among the plurality of battery packs 200 does not exceed the predetermined voltage threshold, based on the OCV of each of the plurality of battery packs 200 estimated by the estimation unit 114.

The management unit 110 may preset a voltage threshold such that a charging rate from the battery pack 200 with the highest voltage to the battery pack 200 with the lowest voltage does not exceed a predetermined charging rate threshold. For example, the charging rate threshold may be 0.3 C or less, or more desirably, may be 0.2 C or less.

For example, when a battery pack 200 of 5 kWh, or 15 Ah, with the DICR of $1.87\Omega$ at minimum and $1.99\Omega$ on average, and the voltage of 270-396 V is used, for setting the DCIR as $2\Omega$, and the charging rate as 0.2 C of 3 A in charging, the difference in voltage between the battery pack 200 with the highest voltage and the battery pack 200 with the lowest voltage<(0.2 (C)×15 (Ah)×2($\Omega$)=6 V), yielding the voltage threshold of 6 V. In this case, the management unit 110 causes the battery pack 200 with the highest voltage, which will be referred to as the first battery pack 200, to start discharging, then before the voltage of the first battery pack 200 becomes lower than a voltage of a battery pack 200 with a second highest voltage, which will be referred to as the second battery pack 200, by 6 V or more, causes the second battery pack 200 to start discharging, and then causes the first battery pack 200 to stop discharging after the predetermined time has passed.

Also, for setting the charging rate as 0.3 C, the difference in voltage between the battery pack 200 with the highest voltage and the battery pack 200 with the lowest voltage< (0.3 (C)×15 (Ah)×2 ($\Omega$)=9 V), yielding the voltage threshold of 9 V. In this case, the management unit 110 causes the first battery pack 200 to start discharge, then before the voltage of the first battery pack 200 becomes lower than the voltage of the second battery pack 200 by 9 V or more, causes the second battery pack 200 to start discharging, and then causes the first battery pack 200 to stop discharging after the predetermined time has passed.

When an electric power generation amount by the solar cell 310 is increased and there is a surplus of the electric power generation amount, for example, the management unit 110 may perform management such that the electric power generated by the solar cell 310 is consumed so that the charging rate at which each of the plurality of battery packs 200 is charged does not exceed the charging rate threshold. For example, the management unit 110 controls the controller 510 to cause the load 500 to consume the electric power generated by the solar cell 310 so that the charging rate at which each of the plurality of battery packs 200 is charged with the electric power generated by the solar cell 310 does not exceed the charging rate threshold.

When the discharging rate of the battery pack 200 which is being discharged among the plurality of battery packs 200 has been slower than a predetermined discharging rate threshold for a predetermined time, the management unit 110 may perform management such that an electric power consumption amount of the battery pack 200 which is being discharged is increased. For example, the management unit 110 controls the controller 510 to cause the load 500 to consume the electric power of the battery pack 200. The predetermined time may be arbitrarily set in seconds or minutes. In this way, it is possible to prevent the battery pack 200 from deteriorating rapidly due to a low discharging rate continuing for a long time. The discharging rate threshold may be 0.3 C-2.0 C, or more desirably, may be 0.4 C-1.0 C.

The following Table 1 shows an experimental result obtained by an experiment on a degree of deterioration for each of various discharging rates and charging rates of the battery pack 200 which has a battery cell using metal lithium for its negative electrode. The experiment was performed multiple times for each combination of the discharging rate and the charging rate, and "⊚" is given when 80% of an initial capacity was maintained for 250 cycles or more on average, "○" is given when 80% of the initial capacity was maintained for 200 cycles or more and less than 250 cycles on average, and "x" is given when 80% of the initial capacity was maintained for 180 cycles or less on average. The experimental result shows that, for example, as a result of repeating the discharging at the discharging rate of 0.3 C and the charging at the charging rate of 0.1 C for each of the plurality of battery packs 200, 80% of the initial capacity was maintained for 200 cycles or more and less than 250 cycles on average. Also, the experimental result shows that, for example, as a result of repeating the discharging at the discharging rate of 0.5 C and the charging at the charging rate of 0.2 C for each of the plurality of battery packs 200, 80% of the initial capacity was maintained for 250 cycles or more on average.

TABLE 1

|  |  | DISCHARGING RATE | | | | | | | | | |
|---|---|---|---|---|---|---|---|---|---|---|---|
|  |  | 0.05 | 0.1 | 0.2 | 0.3 | 0.4 | 0.5 | 0.7 | 1 | 2 | 3 |
| CHARGING | 0.05 | X | X | X | ○ | ⊚ | ⊚ | ⊚ | ⊚ | ○ | X |
| RATE | 0.1 | X | X | X | ○ | ⊚ | ⊚ | ⊚ | ⊚ | ○ | X |
|  | 0.2 | X | X | X | ○ | ○ | ⊚ | ⊚ | ⊚ | ○ | X |
|  | 0.3 | X | X | X | X | ○ | ○ | ⊚ | ⊚ | X | X |
|  | 0.4 | X | X | X | X | X | X | X | X | X | X |
|  | 0.5 | X | X | X | X | X | X | X | X | X | X |
|  | 0.7 | X | X | X | X | X | X | X | X | X | X |
|  | 1 | X | X | X | X | X | X | X | X | X | X |

As shown in Table 1, the discharging rate is desirably 0.3 C-2.0 C, and more desirably 0.4 C-1.0 C. The charging rate is desirably 0.3 C or less, and more desirably 0.2 C or less.

The reception unit 116 receives various information from outside. The reception unit 116, for example, receives a control instruction to the management unit 110. The management unit 110 may control the plurality of switching units 210 according to the control instruction received by the reception unit 116. The reception unit 116, for example, receives weather information for an area where the system 10 is located. The management unit 110 may control the plurality of switching units 210 based on the weather information received by the reception unit 116.

Figure 6:
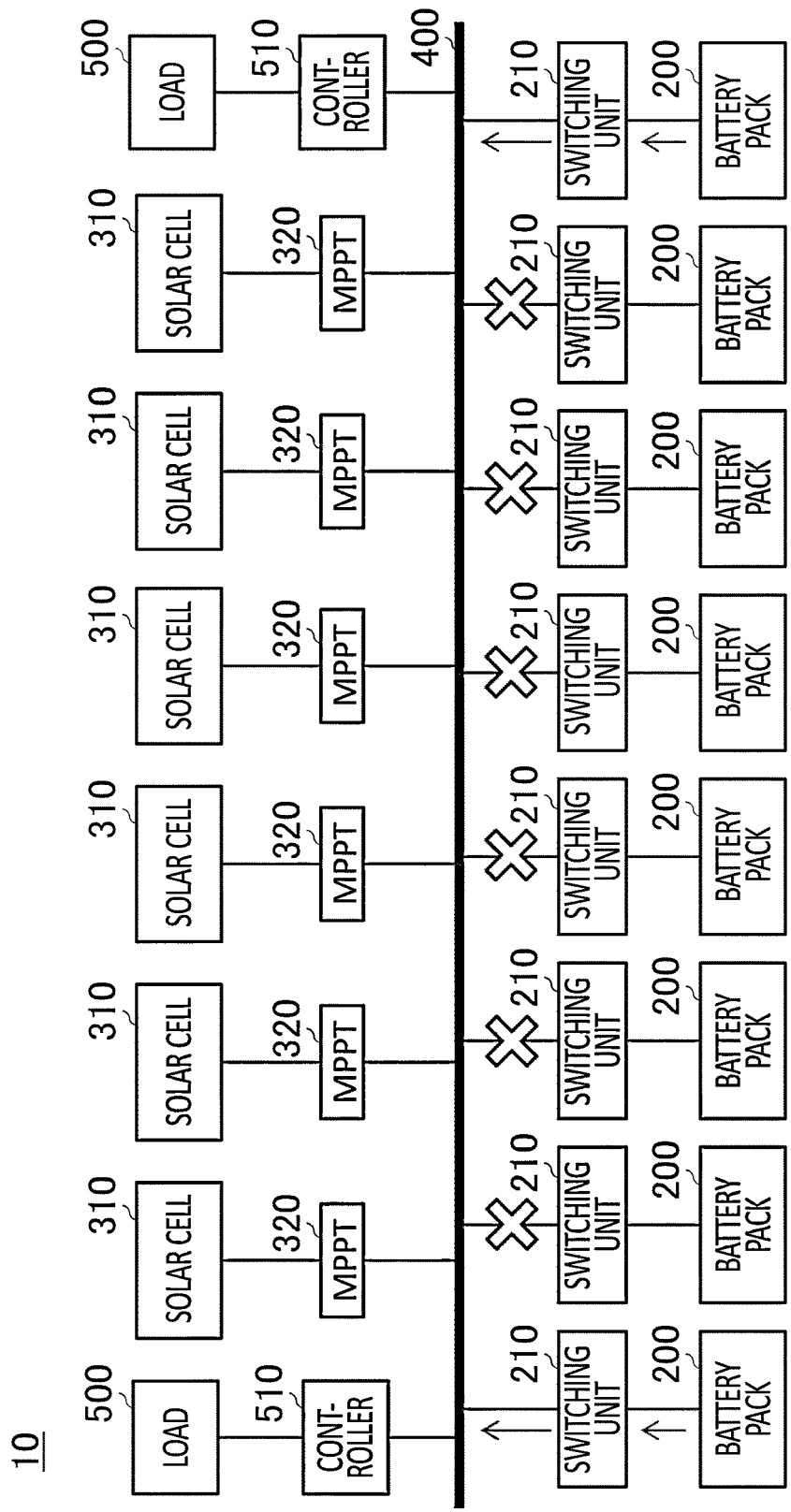
FIG. 6 schematically illustrates another example of the current flow during the discharging in the system 10.

FIG. 6 schematically illustrates another example of the current flow during the discharging in the system 10. The management unit 110 may control the plurality of switching units 210 such that the plurality of battery packs 200 are discharged sequentially, two or more at a time. For example, the management unit 110 controls the plurality of battery packs 200 such that they are discharged sequentially, two at a time. Alternatively, for example, the management unit 110 controls the plurality of battery packs 200 such that they are discharged sequentially, three at a time. Alternatively, for example, the management unit 110 controls the plurality of battery packs 200 such that they are discharged sequentially, four at a time. These are only by way of example and the management unit 110 may perform control such that a larger number of the plurality of battery packs 200 are discharged at a time sequentially.

The management unit 110 may control a plurality of left-side battery packs 200 and a plurality of right-side battery packs 200 so that a difference in voltage between the left side and the right side does not become significant.

For example, the management unit 110 controls the plurality of left-side battery packs 200 and the plurality of right-side battery packs 200 such that one battery pack from the left side and one battery pack from the right side are alternately discharged, such as one from the left side, one from the right side, one from the left side, and then one from the right side. By alternately discharging the left-side battery packs 200 and the right-side battery packs 200, it is possible to prevent the difference in voltage between the left side and the right side from becoming significant.

At this time, the management unit 110 may cause one battery pack from the left side and one battery pack from the right side to discharge alternately, taking into account a positional relationship between the plurality of left-side battery packs 200 and the plurality of right-side battery packs 200. For example, the management unit 110 causes one battery pack from the left side and one battery pack from the right side to discharge alternately, such as discharging a left-side battery pack 200, a right-side battery pack 200 which positionally corresponds to the left-side battery pack 200, a next left-side battery pack 200, and then a right-side battery pack 200 which positionally corresponds to the left-side battery pack 200. Positionally corresponding may be, for example, being positioned symmetrically. For example, the management unit 110 causes a first battery pack 200 to discharge and then causes an eighth battery pack 200 positioned symmetrically with the first battery pack 200 to discharge, causes a second battery pack 200 to discharge and then causes a seventh battery pack 200 positioned symmetrically with the second battery pack 200 to discharge, causes a third battery pack 200 to discharge and then causes a sixth battery pack 200 positioned symmetrically with the third battery pack 200 to discharge, and causes a fourth battery pack 200 to discharge and then causes a fifth battery pack 200 positioned symmetrically with the fourth battery pack 200 to discharge.

Alternatively, for example, the management unit 110 may cause one battery pack from the left side and one battery pack from the right side to discharge alternately, not taking into account the positional relationship between the plurality of left-side battery packs 200 and the plurality of right-side battery packs 200. For example, the management unit 110 causes the first battery pack 200 to discharge and then causes any one of the fifth to eighth battery packs 200 to discharge, causes the second battery pack 200 to discharge and then causes any one of remaining three battery packs among the fifth to eighth battery packs 200 to discharge, causes the third battery pack 200 to discharge and then causes any one of remaining two battery packs among the fifth to eighth battery packs 200 to discharge, and causes the fourth battery pack 200 to discharge and then causes a remaining one among the fifth to eighth battery packs 200 to discharge.

Alternatively, for example, the management unit 110 may control the plurality of switching units 210 such that respective ones from the plurality of left-side battery packs 200 and from the plurality of right-side battery packs 200 are sequentially discharged. At this time, the management unit 110 may control the plurality of switching units 210 such that the respective ones from the plurality of left-side battery packs 200 and from the plurality of right-side battery packs 200 are sequentially discharged, taking into account the positional relationship between the plurality of left-side battery packs 200 and the plurality of right-side battery packs 200. For example, the management unit 110 may control the plurality of switching units 210 such that the respective ones from the plurality of left-side battery packs 200 and from the plurality of right-side battery packs 200 are sequentially discharged in a symmetrical manner.

For example, the management unit 110 controls the plurality of switching units 210 such that the first battery pack 200 and the eighth battery pack 200, the second battery pack 200 and the seventh battery pack 200, the third battery pack 200 and the sixth battery pack 200, and the fourth battery pack 200 and the fifth battery pack 200 are discharged in this order. For example, when the first battery pack 200 and the second battery pack 200 are discharged, a power transmission path to the left-side load 500 becomes short, while a power transmission path to the right-side load 500 becomes long, which causes poor power transmission efficiency. On the contrary, symmetrical discharging can prevent one of the power transmission paths for the left-side load 500 and the right-side load 500 from becoming long and can suppress a decrease in the power transmission efficiency. In this case, when the first battery pack 200 and the eighth battery pack 200 are discharged, the management unit 110 may cause the first battery pack 200 and the eighth battery pack 200 to simultaneously discharge, alternately discharge, or sequentially discharge.

The management unit 110 may perform control such that among a set of the first battery pack 200 and the eighth battery pack 200, a set of the second battery pack 200 and the seventh battery pack 200, a set of the third battery pack 200 and the sixth battery pack 200, and a set of the fourth battery pack 200 and the fifth battery pack 200, the set with a higher voltage gains a higher priority and is discharged in order of the priority. For example, the management unit 110 identifies a battery pack 200 with a higher voltage for each of a plurality of sets and gives a higher priority to a set including the identified battery pack 200 with a higher voltage and cause the sets to discharge in order of the priority. Alternatively, for example, the management unit 110 gives a higher priority to a set with a higher voltage on average among the plurality of sets and cause the sets to discharge in order of the priority.

Alternatively, the management unit 110 may control the plurality of switching units 210 such that the respective ones from the plurality of left-side battery packs 200 and from the plurality of right-side battery packs 200 are sequentially discharged, not taking into account the positional relationship between the plurality of left-side battery packs 200 and the plurality of right-side battery packs 200. For example, the management unit 110 may manage the plurality of battery packs 200 such that any combinations of one of the plurality of left-side battery packs 200 and one of the plurality of right-side battery packs 200 are sequentially discharged. For example, the management unit 110 manages the plurality of battery packs 200 such that the first battery pack 200 is combined with any one of the fifth battery pack 200 to the eighth battery pack 200, the second battery pack 200 is combined with any one of the remaining three battery packs among the fifth battery pack 200 to the eighth battery pack 200, the third battery pack 200 is combined with any one of the remaining two battery packs among the fifth battery pack 200 to the eighth battery pack 200, and the fourth battery pack 200 is combined with a remaining battery pack 200 among the fifth battery pack 200 to the eighth battery pack 200, and these combinations are discharged sequentially.

For example, the management unit 110 identifies a battery pack 200 with a higher voltage for each of the plurality of sets and determines an order of the sets in descending order of voltage. The management unit 110 causes the plurality of sets to discharge while switching the sets as appropriate, according to a determined order, so that the difference in voltage between the battery pack 200 with the highest voltage and the battery pack 200 with the lowest voltage among the plurality of battery packs 200 does not exceed the voltage threshold.

Figure 7:
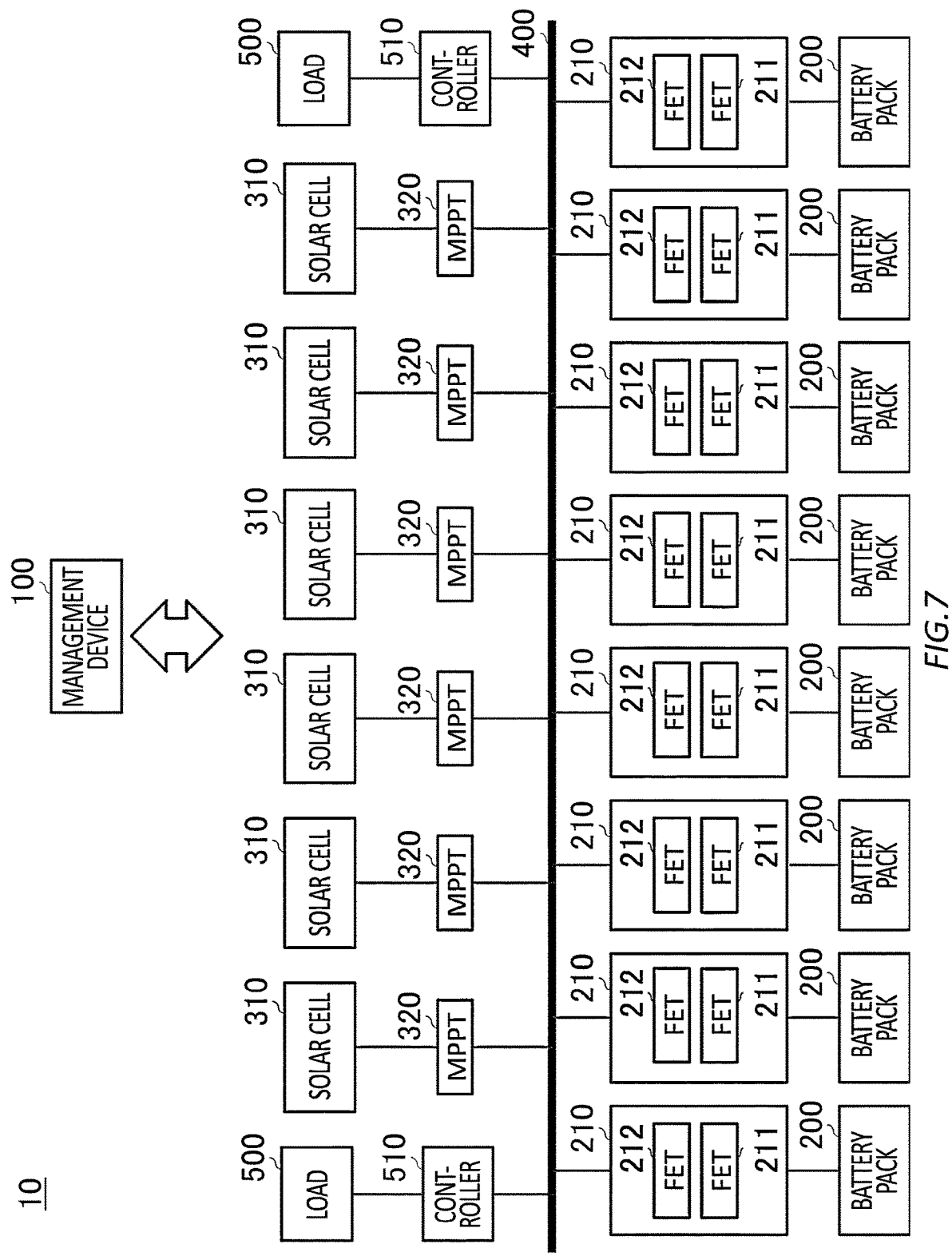
FIG. 7 schematically illustrates an example of a configuration of a plurality of switching units 210.

FIG. 7 schematically illustrates an example of a configuration of the plurality of switching units 210. In the system 10 according to the present embodiment, at least any one of the plurality of switching units 210 includes an FET 211, which may be referred to as a discharging FET, and an FET 212, which may be referred to as a charging FET, which FETs can be switched between a discharging state in which the current flows from a connected battery pack 200 to the bus 400, a charging state in which the current flows from the bus 400 to the battery pack 200, and a shut-off state in which the current does not flow between the bus 400 and the battery pack 200.

Both the discharging FET and the charging FET may be a P-type FET. Both the discharging FET and the charging FET may also be a N-type FET. The management unit 110 controls the discharging FET and the charging FET to switch the charging state, the discharging state, and the shut-off state. The discharging FET and the charging FET may be configured in any way as long as they can be switched between the charging state, the discharging state, and the shut-off state.

In the example illustrated in FIG. 7, all of the plurality of switching units 210 includes the discharging FET and the charging FET. A contactor mechanically performs ON/OFF control, while an FET electrically controls ON/OFF control. Accordingly, compared to when the contactor is adopted, by adopting the FET, it is possible to improve resistance to ON/OFF switching. In addition, compared to a configuration in which the contactor is added to some or all of the plurality of switching units 210, an overall weight can be reduced.

As described above, when the plurality of battery packs 200 are alternately discharged, while one battery pack 200 is being discharged, the management unit 110 may cause a next battery pack 200 to start discharging and cause the one battery pack 200 to stop discharging after a predetermined time has passed. In this way, it is possible not to interrupt the discharging.

Since the FET has a lower withstand voltage than the contactor, there is a concern of a failure when an overvoltage is applied due to a direct lightning strike to the system 10 or the like, for example. When the FET is broken down due to lightning or the like, it may result in a pattern in which the current cannot be turned off or is unable to become the shut-off state, which may be referred to as a pattern A; a pattern in which the current no longer flows, which may be referred to as a pattern B; and a pattern of half-broken, which may be referred to as a pattern C. In the pattern A, the bus 400 and the battery pack 200 will always be electrically connected, which causes the battery pack 200 to deteriorate rapidly, but it does not significantly influence an operation of the system 10. However, in the pattern B, it will not be possible to utilize the electric power of the battery pack 200 and the operation of the system 10 will be significantly influenced. Also, in the pattern C, since the current will flow through the FET which is of high resistance, it may generate heat and possibly catch fire. Although it is possible to prevent or reduce such issues by adopting various kinds of another mechanism, it is desirable to address such issues also with the configuration of the plurality of switching units 210.

Figure 8:
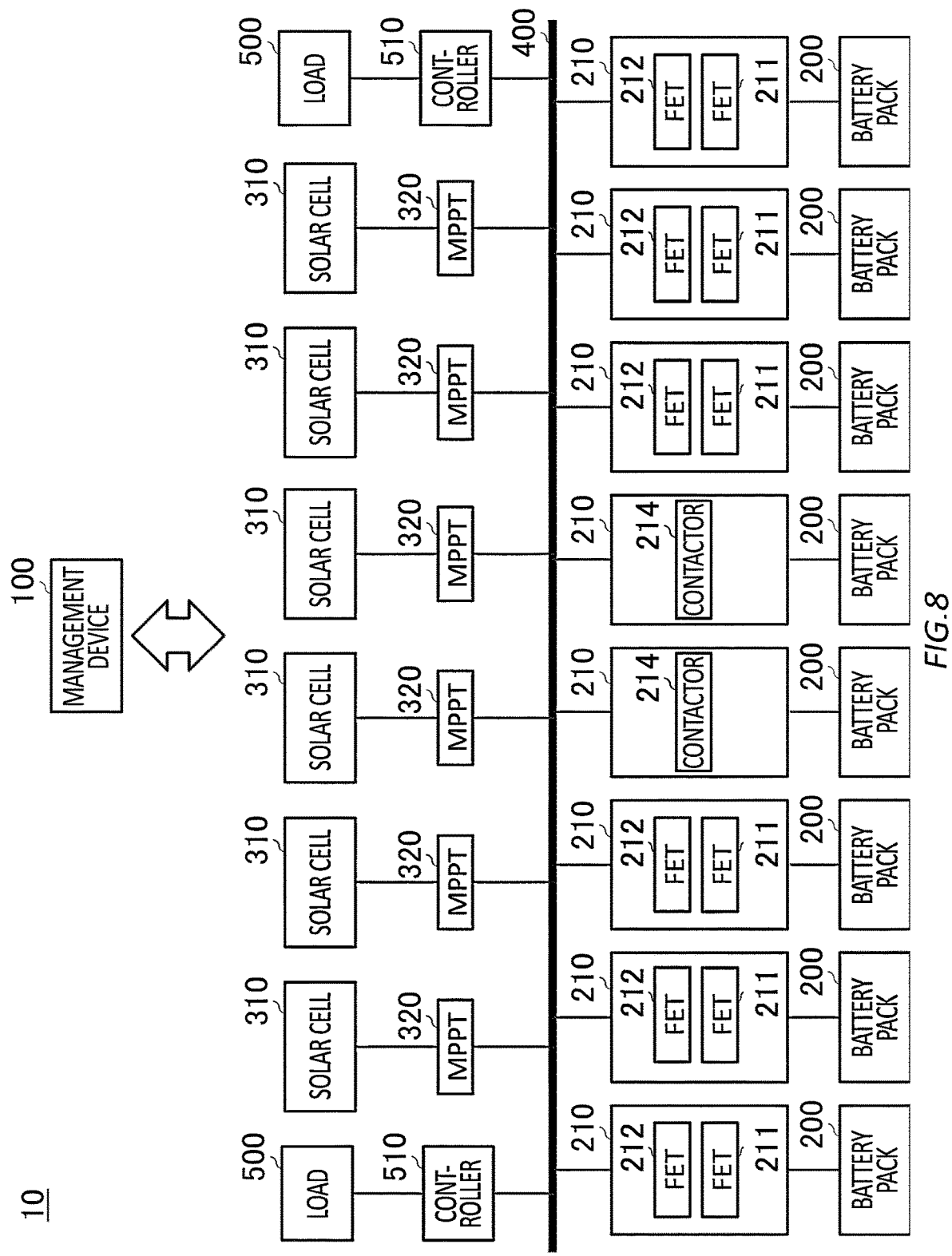
FIG. 8 schematically illustrates another example of the configuration of the plurality of switching units 210.

FIG. 8 schematically illustrates another example of the configuration of the plurality of switching units 210. As illustrated in FIG. 8, the system 10 may be configured such that some of the plurality of switching units 210 each include the discharging FET and the charging FET, and rest of the plurality of switching units 210 include a contactor 214 which switches ON/OFF of the current between the connected battery pack 200 and the bus 400.

In this way, by composing some switching units 210 of the contactor 214, even when the overvoltage is applied to the system 10, it is possible to prevent a breakdown for the some switching units 210 and maintain at least a minimum function.

During charging, the management unit 110 may charge all of the plurality of battery packs 200 by turning the switching units 210 composed of the discharging FET and the charging FET into the charging state and turning on the contactors 214 of the switching units 210 composed of the contactor 214. During the discharging, the management unit 110 may turn on the contactors 214 of the switching units 210 composed of the contactor 214 and turn the plurality of switching units 210 composed of the discharging FET and the charging FET into the discharging state alternately. As described above, during the discharging, while one switching unit 210 among the switching units 210 composed of the discharging FET and the charging FET is in the discharging state, the management unit 110 may turn a next switching unit 210 into the discharging state, and turn the one switching unit 210 into the shut-off state after a predetermined time has passed.

Alternatively, during the discharging, the management unit 110 may turn each of the plurality of switching units 210 composed of the discharging FET and the charging FET into the discharging state alternately so that they do not turn into the discharging state simultaneously. By maintaining the contactors 214 of the switching units 210 composed of the contactor 214 in an ON-state during the discharging, even when alternately turning on the switching units 210 composed of the discharging FET and the charging FET so that they do not turn into the discharging state simultaneously, it is possible not to interrupt the discharging.

A proportion between the switching units 210 including the discharging FET and the charging FET and the switching units 210 including the contactor 214 may be any proportion. For example, by configuring one switching unit 210 among the plurality of switching units 210 by the contactor 214, even when the overvoltage is applied to the system 10, the function of at least one switching unit 210 and battery pack 200 can be maintained. Alternatively, for example, by configuring two switching units 210 among the plurality of switching units 210 by the contactor 214, redundancy can be achieved.

In the example illustrated in FIG. 8, among eight switching units 210, six switching units 210 each include the discharging FET and the charging FET, and two switching units 210 each includes the contactor 214. During charging, the management unit 110 may charge all of the plurality of battery packs 200 by turning the six switching units 210 into the charging state and turning on the contactor 214 of each of the two switching units 210. During the discharging, the management unit 110 may turn on the two contactors 214 and turn the six switching units 210 into the discharging state alternately. As described above, during the discharging, while one switching unit 210 among the six switching units 210 is in the discharging state, the management unit 110 may turn a next switching unit 210 into the discharging state, and turn the one switching unit 210 into the shut-off state after a predetermined time has passed. Alternatively, the management unit 110 may turn the six switching units 210 into the discharging state alternately so that they do not turn into the discharging state simultaneously.

Figure 9:
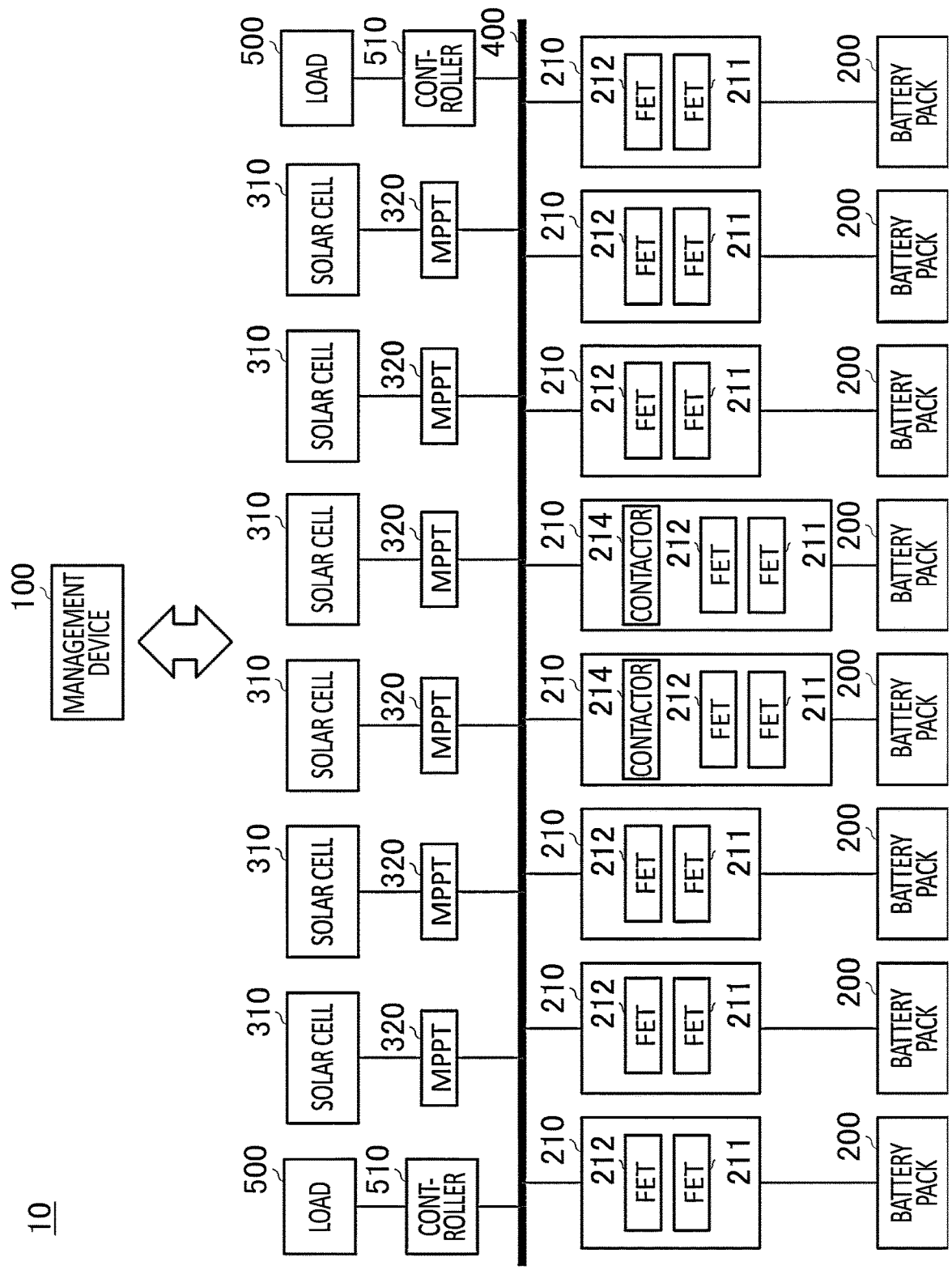
FIG. 9 schematically illustrates another example of the configuration of the plurality of switching units 210.

FIG. 9 schematically illustrates another example of the configuration of the plurality of switching units 210. As illustrated in FIG. 9, the system 10 may be configured such that some of the plurality of switching units 210 include the discharging FET and the charging FET, and rest of the plurality of switching units 210 include the contactor 214 connected to the bus 400, and the discharging FET and the charging FET connected in series between the contactor 214 and the battery pack 200.

The management unit 110 may maintain each contactor 214 of the rest of the plurality of switching units 210 in an OFF state while a predetermined condition is being met. For example, the management unit 110 determines whether the predetermined condition is being met based on weather information for an area where the system 10 is located, received from outside by the reception unit 116. The weather information may represent a present weather of each location. The weather information may also represent a weather forecast for each location. For example, the management unit 110 maintains the contactors 214 in the OFF state while the system 10 is located in an area where the lightning is generated. The management unit 110 may maintain the contactors 214 in an ON state when the system 10 is not located in the area where the lightning is generated. When the contactor 214 is maintained in the OFF state, during the discharging, the management unit 110 may turn some of the plurality of switching units 210 which include the discharging FET and the charging FET among the plurality of switching units 210 into the discharging state alternately, and when the contactor 214 is in the ON state, during the discharging, the management unit 110 may turn all of the plurality of switching units 210 into the discharging state alternately. The area where the lightning is generated may be an area where the lightning is actually being generated or may be an area where the lightning is expected to be generated.

In the example illustrated in FIG. 9, since the contactors 214 are turned off in the area where the lightning is generated, even when FETs of the some of the plurality of switching units 210 fail and the current no longer flows in an event of the lightning, FETs of the rest of the plurality of switching units 210 can be protected. In the example illustrated in FIG. 9, since the contactors 214 are turned on in an area where the lightning is not generated, all in all, it is possible to protect the discharging FETs and the charging FETs of the switching units 210 composed of the contactor 214, the discharging FET, and the charging FET in the area where the lightning is generated, and it is possible to increase the resistance to switching by using the discharging FETs and the charging FETs for switching, not the contactor 214, in an area other than the area where the lightning is generated.

In the example illustrated in FIG. 9, among the eight switching units 210, the six switching units 210 are each composed of the discharging FET and the charging FET, and the two switching units 210 are each composed of the contactor 214, the discharging FET, and the charging FET. While the system 10 is located in the area where the lightning is generated, the management unit 110 may maintain the contactor 214 of each of the two switching units 210 in the OFF state, and when the system 10 is not located in the area where the lightning is generated, the management unit 110 may turn on the contactor 214 of each the two switching units 210. The management unit 110 may turn all of the six switching units 210 into the discharging state alternately during the discharging when the system 10 is located in the area where the lightning is generated, and the management unit 110 may turn the eight switching units 210 into the discharging state alternately during the discharging when the system 10 is not located in the area where the lightning is generated.

There are two types of contactors: one which turns off when a control current is applied, and one which turns on when the control current is applied. The contactor 214 according to the present embodiment may be of a type which turns off when the control current is applied. The management unit 110 applies the control current to the contactor 214 of each of the two switching units 210 to turn it off when the system 10 is located in the area where the lightning is generated. In an event where the system 10 is struck by the lightning and the current no longer flows through the FET 211 and the FET 212 of each of the six switching units 210, it is possible to protect the FET 211 and the FET 212 of each of the two switching units 210. In addition, when a current system fails due to the lightning and an electrical supply has been stopped, the control current to the contactor 214 will be stopped to turn on the contactor 214, which causes the electric power from two battery packs 200 connected to the two switching units 210 to be supplied to the load 500 or the like, thereby making it possible to maintain at least the minimum function of the system 10.

A proportion between the switching units 210 composed of the discharging FET and the charging FET and the switching units 210 composed of the contactor 214, the discharging FET and the charging FET may be any proportion. For example, one switching unit 210 among the plurality of switching units 210 may be composed of the contactor 214, the discharging FET and the charging FET, or two switching units 210 among the plurality of switching units 210 may be composed of the contactor 214, the discharging FET, and the charging FET.

Alternatively, all of the plurality of switching units 210 may be composed of the contactor 214, the discharging FET, and the charging FET. This can further improve safety. In this case, while the system 10 is located in the area where the lightning is generated, the management unit 110 may turn on the contactors 214 of only some switching units 210 among the plurality of switching units 210, and maintain the contactors 214 of any other switching units 210 in the OFF state. The management unit 110 may turn on only the contactors 214 of a number of the switching units 210 required to maintain the minimum function of the system 10 and maintain the contactors 214 of any other switching units 210 in the OFF state. All contactors 214 of the plurality of switching units 210 may be of a type which turns off when the control current is applied, and while the system 10 is located in the area where the lightning is generated, the management unit 110 may turn on the contactors 214 of only some switching units 210 among the plurality of switching units 210 and apply the control current to the contactors 214 of any other switching units 210 to maintain them in the OFF state.

Figure 10:
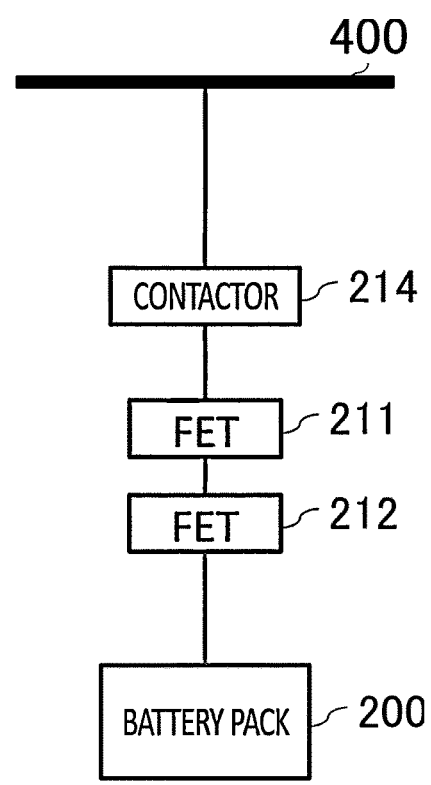
FIG. 10 schematically illustrates an example of a configuration of a switching unit 210 composed of a contactor 214, a discharging FET, and a charging FET.

FIG. 10 schematically illustrates an example of a configuration of the switching unit 210 composed of the contactor 214, the discharging FET, and the charging FET. As illustrated in FIG. 10, the switching unit 210 may include the contactor 214 connected to the bus 400, and the discharging FET and the charging FET connected in series between the contactor 214 and the battery pack 200. The management unit 110, for example, maintains the contactor 214 in the OFF state while the system 10 is located in the area where the lightning is generated. In this way, even when the system 10 is struck by the lightning, no electricity can flow through the FET 211, the FET 212, and the battery pack 200, thereby making it possible to protect the FET 211, the FET 212, and the battery pack 200. The management unit 110 may also turn off the contactor 214 when a malfunction occurs in at least any one of the FET 211 or FET 212 for some reason. When the FET 211 and the FET 212 fail to become, say, the pattern C, if the electricity flows through the FET 211 and the FET 212, they may generate heat and possibly catch fire, but it can be prevented by turning off the contactor 214.

The above-described embodiment describes the contactor 214 of a type which is turned off when the control current is applied, but it is not limited thereto. The contactor 214 may be of a type which turns on when the control current is applied.

Figure 11:
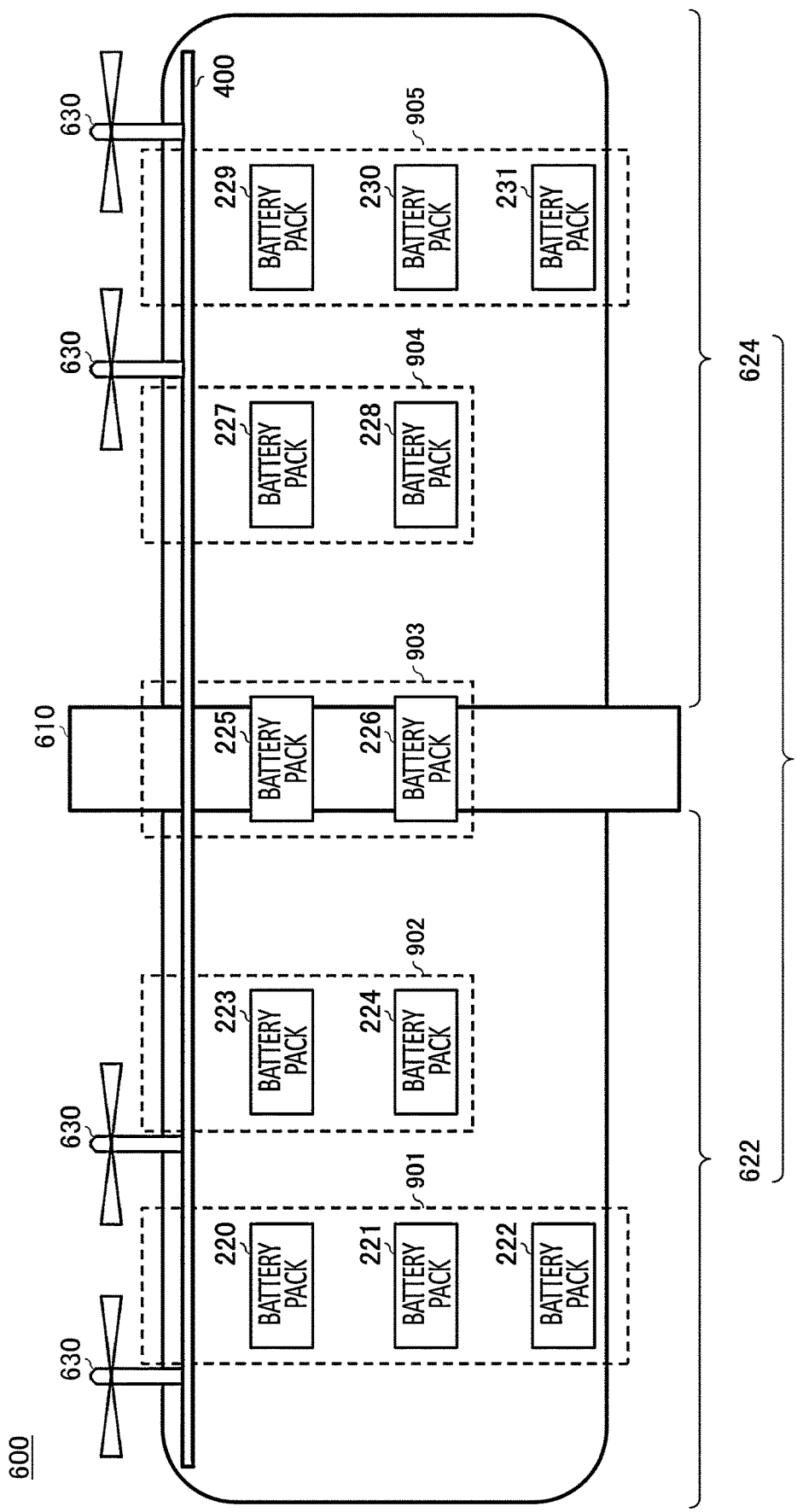
FIG. 11 schematically illustrates an example of an airplane 600 in which the system 10 is installed.

FIG. 11 schematically illustrates an example of an airplane 600 in which the system 10 is installed. The airplane 600 may be an example of a flying object. In FIG. 11, as examples of the plurality of battery packs 200, a battery pack 220 through a battery pack 231 are illustrated. In the example illustrated in FIG. 11, the battery pack 220 through a battery pack 224 are arranged in a left-wing section 622 of a wing portion 620, a battery pack 225 and a battery pack 226 are arranged in a body 610, and a battery pack 227 through the battery pack 231 are arranged in a right-wing section 624 of the wing portion 620.

In FIG. 11, illustration of the management device 100, the plurality of switching units 210, the plurality of power generation units 300, and wiring from the battery pack 220 through the battery pack 231 to the bus 400 is omitted. In addition, an example in which all of the plurality of switching units 210 are composed of the discharging FET and the charging FET will be mainly described.

The management device 100 is arranged, for example, in the body 610 of the airplane 600. The power generation unit 300 is arranged, for example, on an upper surface of the wing portion 620. The battery pack 220 through the battery pack 231 are connected in parallel to the bus 400. A propeller 630 is an example of the load 500.

Here, an order will be described in a case where the management unit 110 causes the plurality of battery packs 200 to discharge sequentially, two at a time. The management unit 110 may select and discharge one from each of a group 901 and a group 905, which are arranged symmetrically, select and discharge one from each of a group 902 and a group 904, and then select and discharge two in a group 903, and repeat this order. The order of selecting one from each of two groups arranged symmetrically may or may not be in a matching front-back direction. For example, in a former case, the management unit 110 causes the battery pack 220 and a battery pack 229, a battery pack 221 and a battery pack 230, and a battery pack 222 and the battery pack 231 to discharge in this order, causes a battery pack 223 and the battery pack 227, and the battery pack 224 and a battery pack 228 to discharge in this order, and then causes the battery pack 225 and the battery pack 226 to discharge.

When some switching units 210 among the plurality of switching units 210 are composed of the contactor 214, for example, the switching units 210 connected to the battery pack 225 and the battery pack 226 may be composed of the contactors 214.

Figure 12:
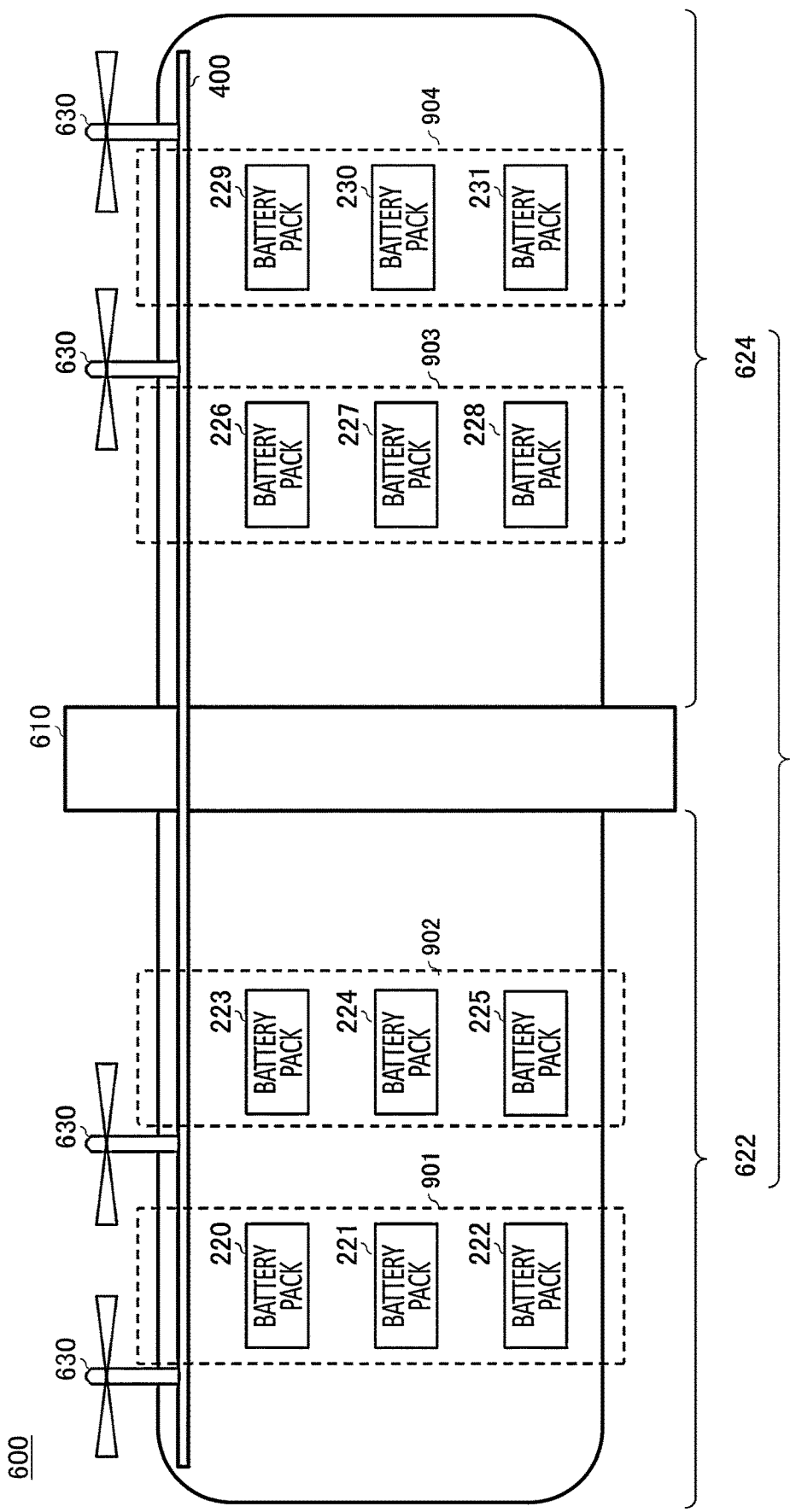
FIG. 12 schematically illustrates another example of the airplane 600 in which the system 10 is installed.

FIG. 12 schematically illustrates another example of the airplane 600 in which the system 10 is installed. Here, a difference from FIG. 11 will be mainly described. In the example illustrated in FIG. 12, the battery pack 220 through the battery pack 225 are arranged in the left-wing section 622 of the wing portion 620, and the battery pack 226 through the battery pack 231 are arranged in the right-wing section 624 of the wing portion 620.

The management unit 110 may select and discharge one from each of the group 901 and the group 904, which are arranged symmetrically, select and discharge one from each of the group 902 and the group 903, and repeat this order. The order of selecting one from each of two groups arranged symmetrically may or may not be in the matching front-back direction. For example, in a former case, the management unit 110 causes the battery pack 220 and the battery pack 229, the battery pack 221 and the battery pack 230, and the battery pack 222 and the battery pack 231 to discharge in this order, and then causes the battery pack 223 and the battery pack 226, the battery pack 224 and the battery pack 227, and the battery pack 225 and the battery pack 228 to discharge in this order.

Figure 13:
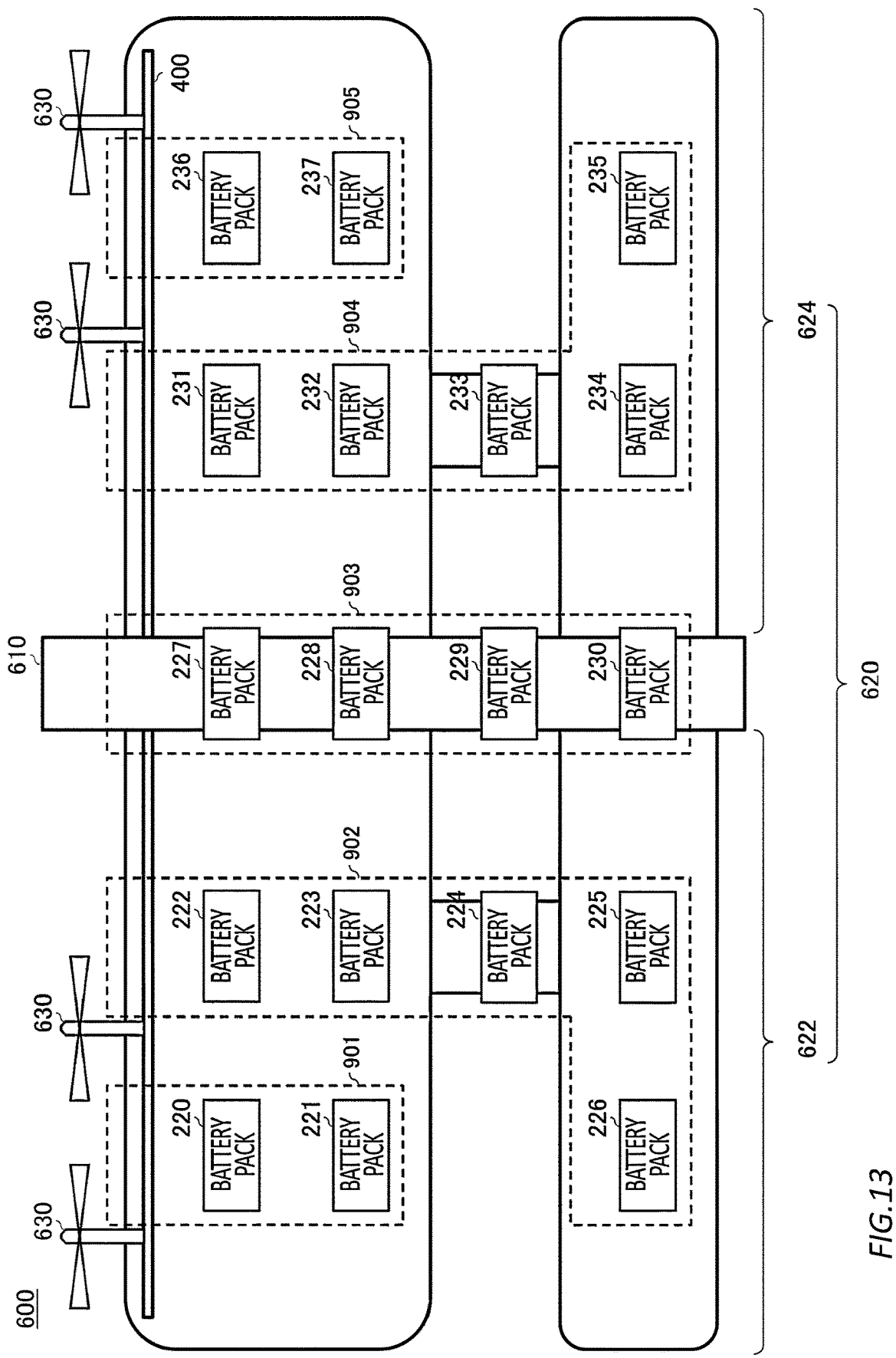
FIG. 13 schematically illustrates another example of the airplane 600 in which the system 10 is installed.

FIG. 13 schematically illustrates another example of the airplane 600 in which the system 10 is installed. Here, a difference from FIG. 11 will be mainly described. In the example illustrated in FIG. 13, the battery pack 220 through the battery pack 226 are arranged on a left side of the airplane 600, the battery pack 227 through 230 are arranged in a central portion of the airplane 600, and the battery pack 231 through a battery pack 237 are arranged on a right side of the airplane 600.

The management unit 110 may select and discharge one from each of the group 901 and the group 905 which are arranged symmetrically, select and discharge one from each of the group 902 and the group 904, and then select and discharge two from the group 903, and repeat this order. The order of selecting one from each of two groups arranged symmetrically may or may not be in the matching front-back direction. For example, in a former case, the management unit 110 causes the battery pack 220 and a battery pack 236, and the battery pack 221 and the battery pack 237 to discharge in this order, and causes the battery pack 222 and the battery pack 231, the battery pack 223 and a battery pack 232, the battery pack 224 and a battery pack 233, the battery pack 225 and a battery pack 234, and the battery pack 226 and a battery pack 235 to discharge in this order, and then causes the battery pack 227 and the battery pack 228, and the battery pack 229 and the battery pack 230 to discharge in this order.

Figure 14:
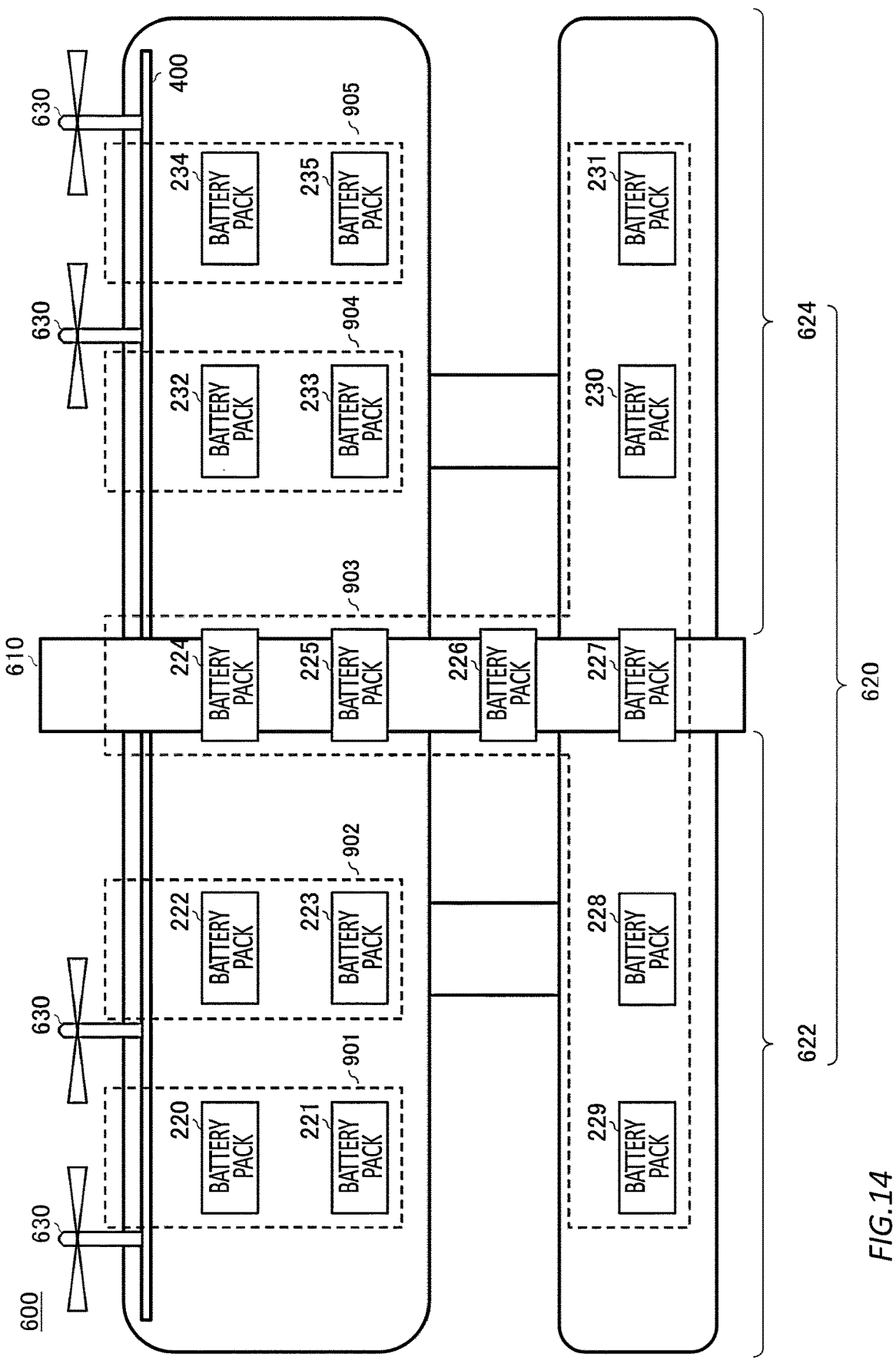
FIG. 14 schematically illustrates another example of the airplane 600 in which the system 10 is installed.

FIG. 14 schematically illustrates another example of the airplane 600 in which the system 10 is installed. Here, a difference from FIG. 11 will be mainly described. In the example illustrated in FIG. 14, the battery pack 220 through the battery pack 223, the battery pack 228, and the battery pack 229 are arranged in the left-wing section 622 of the wing portion 620, the battery pack 224 through the battery pack 227 are arranged in the central portion of the airplane 600, and the battery pack 230 through the battery pack 235 are arranged in the right-wing section 624 of the wing portion 620.

The management unit 110 may select and discharge one from each of the group 901 and the group 905 which are arranged symmetrically, select and discharge one from each of the group 902 and the group 904, and then select and discharge two from the group 903, and repeat this order. The order of selecting one from each of two groups arranged symmetrically may or may not be in the matching front-back direction. For example, in a former case, the management unit 110 causes the battery pack 220 and the battery pack 234, the battery pack 221 and the battery pack 235 to discharge in this order, causes the battery pack 222 and the battery pack 232, the battery pack 223 and the battery pack 233 to discharge in this order, and then causes the battery pack 229 and the battery pack 231, the battery pack 228 and the battery pack 230, the battery pack 226 and the battery pack 227, and the battery pack 224 and the battery pack 225 to discharge in this order.

Figure 15:
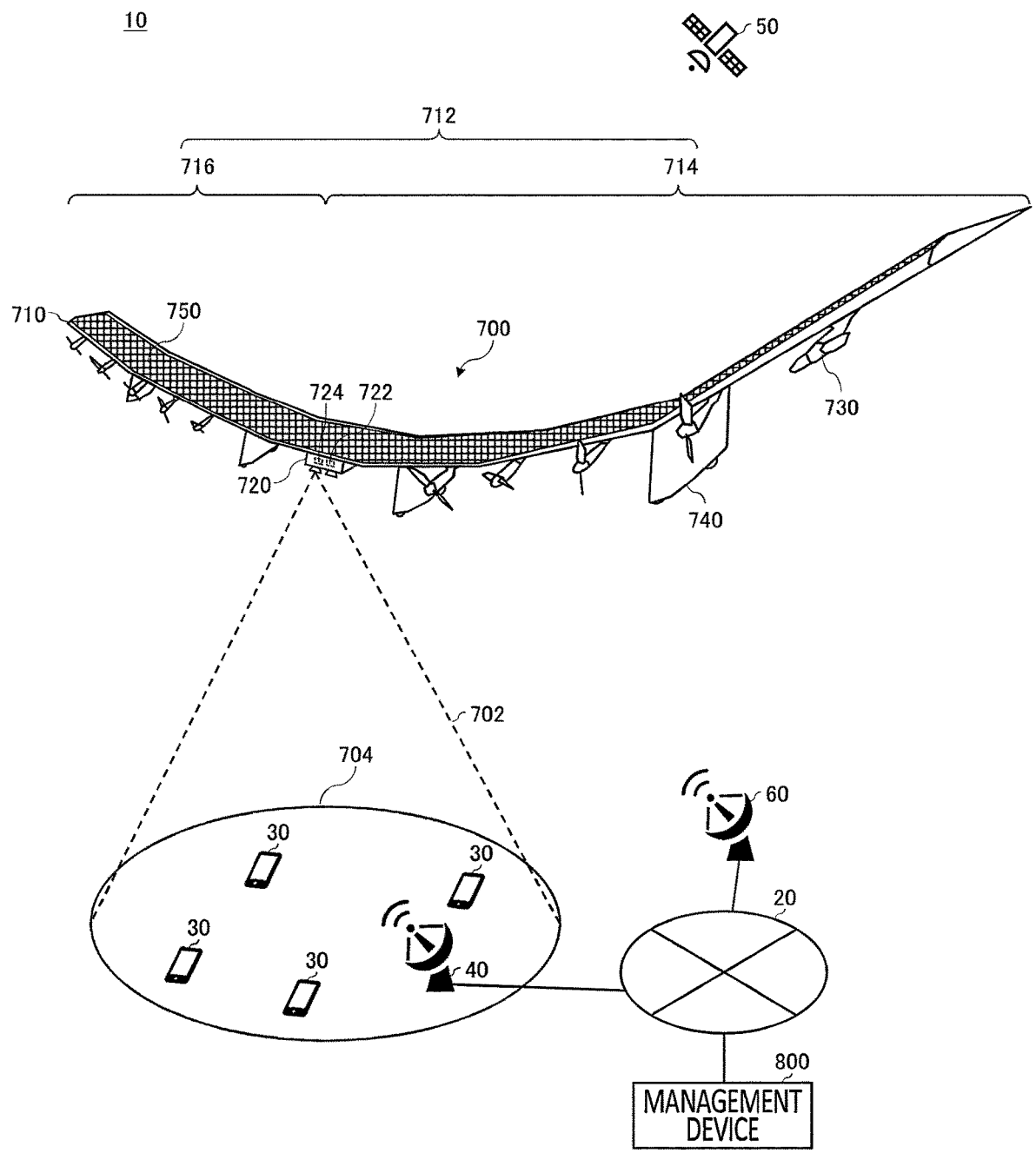
FIG. 15 schematically illustrates an example of a HAPS 700 in which the system 10 is installed.

FIG. 15 schematically illustrates an example of a HAPS 700 in which the system 10 is installed. The HAPS 700 is a flying object which provides a wireless communication service to a user terminal 30 within a communication area 704 formed by an irradiated beam 702 to a ground.

The HAPS 700 includes a body 710, a center portion 720, a propeller 730, a pod 740, and a solar panel 750. The body 710 includes a wing portion 712. The wing portion 712 includes a left-wing section 714 and a right-wing section 716.

Inside the wing portion 712, the plurality of battery packs 200 connected in parallel are arranged. Among the plurality of battery packs 200, the plurality of left-side battery packs 200 may be arranged in the left-wing section 714, and the plurality of right-side battery packs 200 may be arranged in the right-wing section 716. The plurality of battery packs 200 may be connected to the bus 400 via the plurality of switching units 210. The solar panel 750 may be connected to the bus 400 via the MPPT 320. The electric power discharged by the plurality of battery packs 200 is utilized by each component included in the HAPS 700. For example, the electric power discharged by the plurality of battery packs 200 is utilized by a motor of the propeller 730. The motor of the propeller 730 may be an example of the load 500.

Inside the center portion 720, a flight control unit 722, a communication control unit 724, and the management device 100 not shown are arranged. The flight control unit 722 uses the electric power discharged by the plurality of battery packs 200 and controls a flight of the HAPS 700. The communication control unit 724 uses the electric power discharged by the plurality of battery packs 200 and controls communication of the HAPS 700.

The flight control unit 722 controls the flight of the HAPS 700 by controlling a rotation of the propeller 730, for example. Also, the flight control unit 722 may control the flight of the HAPS 700 by changing an angle of a flap or an elevator which are not shown. The flight control unit 722 may include various sensors such as a positioning sensor such as a GPS sensor, a gyro sensor, and an acceleration sensor to manage a position, a movement direction, and a movement speed of the HAPS 700.

The communication control unit 724 uses an SL, or Service Link, antenna to form the communication area 704 on the ground. The communication control unit 724 uses the SL antenna to form a service link with the user terminal 30 on the ground. The SL antenna may be a multi-beam antenna. The communication area 704 may be a multi-cell.

The communication control unit 724 may use an FL, or Feeder Link, antenna to form a feeder link with a gateway 40 on the ground. The communication control unit 724 may access a network 20 via the gateway 40.

The communication control unit 724 may use a satellite communication antenna to communicate with a communication satellite 50. The communication control unit 724 may access the network 20 via the communication satellite 50 and a satellite communication station 60.

The user terminal 30 may be any communication terminal as long as it is able to communicate with the HAPS 700. For example, the user terminal 30 is a mobile phone such as a smartphone. The user terminal 30 may also be a tablet terminal, a PC, or Personal Computer, and the like. The user terminal 30 may also be a so-called IoT, or Internet of Thing, device. The user terminal 30 may include anything which corresponds to a so-called IoE, or Internet of Everything.

The HAPS 700 relays communication between the network 20 and the user terminal 30 via, for example, the feeder link or the communication satellite 50 and the service link. The HAPS 700 may relay communication between the user terminal 30 and the network 20 to provide the wireless communication service to the user terminal 30.

The network 20 includes a mobile communication network. The mobile communication network may conform to any of the 3G, or 3rd Generation, communication scheme, the LTE, or Long Term Evolution, communication scheme, the 5G, or 5th Generation, communication scheme, and the 6G, or 6th Generation, communication scheme and a communication scheme of a subsequent generation. The network 20 may include the Internet.

For example, the HAPS 700 transmits data received from the user terminal 30 in the communication area 704 to the network 20. In addition, for example, when the HAPS 700 receives data to be sent to the user terminal 30 in the communication area 704 via the network 20, transmits the data to the user terminal 30.

For example, the HAPS 700 maintains the communication area 704 in a particular area on the ground while going around a predetermined flight path in the stratosphere. The HAPS 700 stores the electric power generated by the solar panel 750 during daytime in the plurality of battery packs 200 and uses the electric power of the plurality of battery packs 200 during nighttime to maintain the flight in the stratosphere. For example, during the daytime, the HAPS 700 charges the plurality of battery packs 200 while ascending to store potential energy, and during the nighttime, it uses the electric power in the battery packs 200 as appropriate to operate the propeller 730 or the like while gradually descending, thereby maintaining the flight in the stratosphere.

A management device 800 manages a plurality of HAPSs 700. The management device 800 may communicate with the HAPS 700 via the network 20 and the gateway 40. The management device 800 may communication with the HAPS 700 via the network 20, the satellite communication station 60, and the communication satellite 50.

The management device 800 transmits an instruction to control HAPS 700. In order to cover a target area on the ground with the communication area 704, the management device 800 may cause the HAPS 700 to swirl in air over the target area. For example, the HAPS 700 maintains the feeder link with the gateway 40 by adjusting an orientation direction of the FL antenna and maintains a coverage of the target area with the communication area 704 by adjusting an orientation direction of the SL antenna, while flying in the air over the target area in a circular orbit.

As described above, the management unit 110 of the management device 100 manages the plurality of battery packs 200 such that the plurality of battery packs 200 are alternately discharged so that the difference in voltage between the battery pack 200 with the highest voltage and the battery pack 200 with the lowest voltage among the plurality of battery packs 200 does not exceed the voltage threshold. In this way, as described above, it is possible to suppress the deterioration of the plurality of battery packs 200 and extend a time for which the HAPS 700 can maintain its flight in the stratosphere.

The management unit 110 may perform management such that the HAPS 700 ascends with the electric power generated by the solar panel 750, so that the charging rate at which the plurality of battery packs 200 are charged with the electric power generated by the solar panel 750 does not exceed the charging rate threshold. For example, the management unit 110 performs control such that the electric power generated by the solar panel 750 is supplied to the propeller 730, the flap, the elevator, and the like, and the flight control unit 722 controls the propeller 730, the flap and the elevator to cause the HAPS 700 to ascend. By converting surplus electric power into the potential energy, it is possible to make full use of the surplus electric power.

When the discharging rate of the battery pack 200 which is being discharged among the plurality of battery packs 200 has been slower than the discharging rate threshold for a predetermined time, the management unit 110 may perform management such that the load 500 is to ascend with the electric power of the battery pack 200 which is being discharged. For example, the management unit 110 performs control such that the electric power of the battery pack 200 which is being discharged is supplied to the propeller 730, the flap, the elevator, and the like, and the flight control unit 722 controls the propeller 730, the flap, and the elevator to cause the HAPS 700 to ascend. By converting the electric power into the potential energy while maintaining the discharging rate of the battery pack 200 being discharged at a preferable discharging rate, it is possible to make full use of the electric power.

The management unit 110 may manage the plurality of battery packs 200 such that during a time period defined as the daytime, the plurality of battery packs 200 are alternately discharged so that the difference in voltage between the battery pack 200 with the highest voltage and the battery pack 200 with the lowest voltage does not exceed a first voltage threshold, and during a time period defined as the nighttime, the plurality of battery packs 200 are alternately discharged so that the difference in voltage between the battery pack 200 with the highest voltage and the battery pack 200 with the lowest voltage does not exceed a second voltage threshold which is greater than the first voltage threshold. Since the plurality of battery packs 200 will not be charged by the solar panel 750 during the nighttime, even if the difference in voltage between the battery pack 200 with the highest voltage and the battery pack 200 with the lowest voltage is greater than that of during the daytime, it is less problematic. By setting a voltage threshold used during the nighttime to the second voltage threshold which is greater than the first voltage threshold used during the daytime, it is possible to reduce a number of times of switching the battery packs 200 to be discharged.

Figure 16:
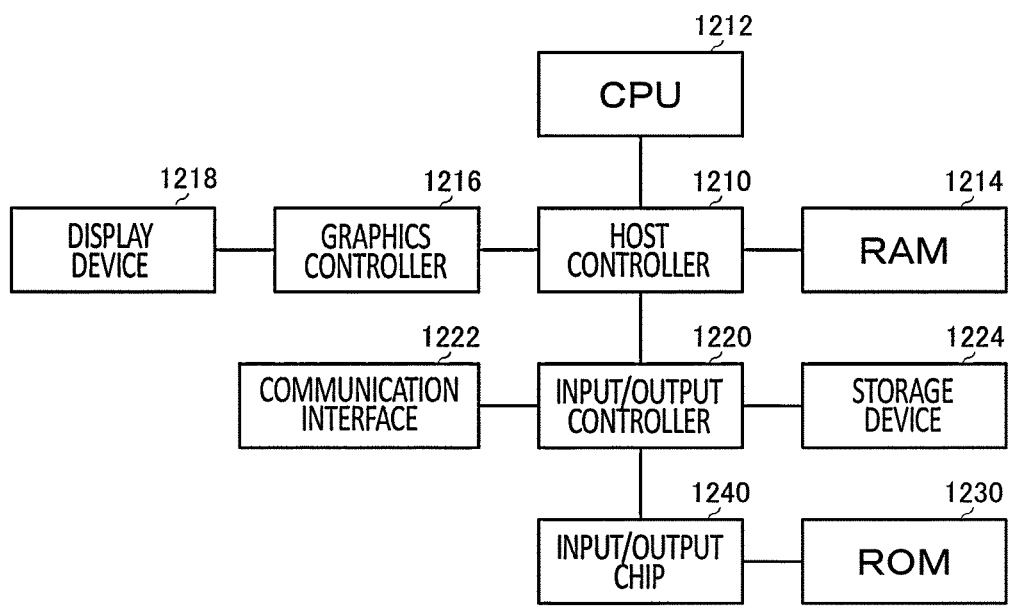
FIG. 16 schematically illustrates an example of a hardware configuration of a computer 1200 which functions as the management device 100.

FIG. 16 schematically illustrates an example of a hardware configuration of a computer 1200 which functions as the management device 100. Programs installed on the computer 1200 can cause the computer 1200 to function as one or more "units" of the device according to the above-described embodiment or can cause the computer 1200 to execute an operation or the one or more "units" associated with the device according to the above-described embodiment, and/or can cause the computer 1200 to execute a process or a stage of the process according to the above-described embodiment. Such programs may be executed by a CPU 1212 to cause the computer 1200 to execute a particular operation associated with some or all blocks in a flowchart and a block diagram described in the present specification.

The computer 1200 according to the present embodiment includes the CPU 1212, a RAM 1214, and a graphics controller 1216, which are mutually connected by a host controller 1210. In addition, the computer 1200 includes a communication interface 1222, a storage device 1224, and an input/output unit such as a DVD drive and an IC card drive, which are connected to the host controller 1210 via an input/output controller 1220. The storage device 1224 may be a hard disk drive, a solid-state drive, and the like. The computer 1200 also includes a legacy input/output unit such as a ROM 1230 and a keyboard, which are connected to the input/output controller 1220 via an input/output chip 1240.

The CPU 1212 operates according to the programs stored in the ROM 1230 and the RAM 1214, thereby controlling each unit. The graphics controller 1216 acquires image data generated by the CPU 1212 on a frame buffer or the like provided in the RAM 1214 or in itself to cause the image data to be displayed on a display device 1218.

The communication interface 1222 communicates with another electronic device via a network. The storage device 1224 stores the programs and data used by the CPU 1212 in the computer 1200. The IC card drive reads the programs and data from an IC card and/or writes the programs and data into the IC card.

The ROM 1230 stores therein a boot program or the like executed by the computer 1200 at a time of activation, and/or a program which depends on hardware of the computer 1200. The input/output chip 1240 may also connect various input/output units to the input/output controller 1220 via a USB port, a parallel port, a serial port, a keyboard port, a mouse port, or the like.

The programs are provided by a computer-readable storage medium such as a DVD-ROM or the IC card. The programs are read from the computer-readable storage medium, installed on the storage device 1224, RAM 1214, or ROM 1230, which are also examples of the computer-readable storage medium, and executed by the CPU 1212. Information processing written in these programs is read by the computer 1200, and provides cooperation between the programs and the various types of hardware resources described above. A device or method may be configured by achieving the operation or processing of information according to usage of the computer 1200.

For example, when communication is executed between the computer 1200 and an external device, the CPU 1212 may execute a communication program loaded on the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, transmits the read transmission data to a network or writes reception data received from the network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, or the like, and execute various types of processing on the data on the RAM 1214. Then, the CPU 1212 may write the processed data back into the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgment, conditional branching, unconditional branching, information search/replacement, or the like described throughout the present disclosure and designated by instruction sequences of the programs, to write the results back to the RAM 1214. In addition, the CPU 1212 may search for information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby acquiring the attribute value of the second attribute associated with the first attribute that meets a predetermined condition.

The programs or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent stages of processes in which operations are executed or "units" of a device responsible for executing operations. A particular stage and "unit" may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and another logical operation, and a flip-flop, a register, and a memory element, such as a field programmable gate array (FPGA), a programmable logic array (PLA), or the like.

The computer-readable storage medium may include any tangible device capable of storing an instruction executed by an appropriate device, so that the computer-readable storage medium having the instruction stored thereon includes a product including an instruction which may be executed to provide means for executing an operation designated by a flowchart or a block diagram. Examples of the computer-readable storage medium may include an electronic storage medium, a magnetic storage medium, an optical storage medium, an electromagnetic storage medium, a semiconductor storage medium, and the like. More specific examples of computer-readable storage medium may include a floppy (registered trademark) disc, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, or the like.

The computer-readable instructions may include an assembler instruction, an instruction-set-architecture (ISA) instruction, a machine instruction, a machine dependent instruction, a microcode, a firmware instruction, state-setting data, or any of a source code or object code written in any combination of one or more programming languages including an object oriented programming language such as Smalltalk (registered trademark), JAVA (registered trademark), and C++, or the like, and a conventional procedural programming language such as a "C" programming language or a similar programming language.

The computer-readable instruction may be provided to a general purpose computer, a special purpose computer, or a processor or programmable circuit of another programmable data processing apparatus locally or via a local area network (LAN), a wide area network (WAN) such as the Internet or the like in order that the general purpose computer, the special purpose computer, or the processor or the programmable circuit of another programmable data processing apparatus executes the computer-readable instruction to generate means for executing operations designated by the flowchart or the block diagram. Examples of the processor include a computer processor, a processing unit, a microprocessor, a digital signal processor, a controller, a microcontroller, or the like.

While the present invention has been described above by way of the embodiments, the technical scope of the present invention is not limited to the scope of the above-described embodiments. It is apparent to persons skilled in the art that various alterations or improvements can be made to the above-described embodiments. It is also apparent from the description of the claims that the embodiments to which such alterations or improvements are made may be included in the technical scope of the present invention.

It should be noted that each process such as an operation, a procedure, a step, a stage, or the like in a device, a system, a program, and a method shown in the claims, the specification, and the drawings may be achieved in any order as long as the order is not explicitly specified by "prior to," "before," or the like particularly and as long as an output from a previous process is not used in a later process. Even if an operational flow in the claims, the specification, and the drawings is described using phrases such as "first", "then", or the like for convenience, it does not necessarily mean that it must be performed in this order.

In the present invention, since it is possible to suppress the deterioration of the battery by improving the discharging rate of the battery and to improve a battery life, it will be possible to contribute to achievement of Sustainable Development Goals, or SDGs, Goal 7 "affordable and clean energy", or Goal 13 "take concrete action to combat climate change", or the like.

EXPLANATION OF REFERENCES

10: system; 20: network; 30: user terminal; 40: gateway; 50: communication satellite; 60: satellite communication station; 100: management device; 110: management unit; 112: pack-related information acquisition unit; 114: estimation unit; 116: reception unit; 200: battery pack; 202: cell; 210: switching unit; 211: FET; 212: FET; 214: contactor; 220, 221, 222, 223, 224, 225, 226, 227, 228, 229, 230, 231, 232, 233, 234, 235, 236, 237: battery pack 300: power generation unit; 310: solar cell; 320: MPPT; 400: bus; 500: load; 510: controller; 600: airplane; 610: body; 620: wing portion; 622: left-wing section; 624: right-wing section; 630: propeller; 700: HAPS; 702: beam; 704: communication area; 710: body; 712: wing portion; 714: left-wing section; 716: right-wing section; 720: center portion; 722: flight control unit; 724: communication control unit; 730: propeller; 740: pod; 750: solar panel; 800: management device; 901, 902, 903, 904, 905: group; 1200: computer; 1210: host controller; 1212: CPU; 1214: RAM; 1216: graphics controller; 1218: display device; 1220: input/output controller; 1222: communication interface; 1224: storage device; 1230: ROM; 1240: input/output chip.

What is claimed is:

1. A system comprising:
    a plurality of switching units connected in parallel to a bus to which a power generation unit and a load are connected, each of the plurality of switching units switching ON/OFF of a connection of a battery pack to the bus;
    a plurality of battery packs individually connected to each of the plurality of switching units, each of the plurality of battery packs being identical to the battery pack; and
    a management unit which manages the plurality of switching units such that the plurality of battery packs are alternately discharged so that a discharging rate of each of the plurality of battery packs is increased compared to when all of the plurality of battery packs are discharged, wherein
    some of the plurality of switching units comprise a discharging FET and a charging FET connected in series which are able to switch between a discharging state in which current flows from the battery pack connected thereto to the bus, a charging state in which the current flows from the bus to the battery pack, and a shut-off state in which the current does not flow between the bus and the battery pack, and rest of the plurality of switching units comprise a contactor connected to the bus, and the discharging FET and the charging FET connected in series between the contactor and the battery pack.

2. The system according to claim 1, wherein
    the management unit maintains the contactor of each of the rest of the plurality of switching units in an OFF state while a predetermined condition is being met.

3. The system according to claim 2, wherein
    the management unit maintains the contactor of each of the rest of the plurality of switching units in the OFF state while the system is located in an area where lightning is generated.

4. The system according to claim 2, wherein
    when a malfunction occurs in at least any one of the discharging FET or the charging FET of each of the rest of the plurality of switching units, the management unit maintains the contactor of the rest of the plurality of switching units in the OFF state.

5. The system according to claim 2, wherein
the contactor is of a type which turns off when control current is applied, and
the management unit applies the control current to the contactor while the predetermined condition is being met.

6. The system according to claim 1, wherein
the management unit controls the plurality of switching units to simultaneously charge the plurality of battery packs with electric power generated by the power generation unit.

7. The system according to claim 1, wherein
the system is installed in a flying object,
the plurality of battery packs are arranged in a wing portion of the flying object,
the power generation unit performs solar power generation, and
the load is a motor which rotates a propeller of the flying object.

8. The system according to claim 7 comprising the flying object.

9. The system according to claim 8, wherein
the flying object comprises:
a communication control unit which provides a wireless communication service to a user terminal within a communication area formed by an irradiated beam to a ground with electric power discharged by the plurality of battery packs.

10. A system comprising:
a plurality of switching units connected in parallel to a bus to which a power generation unit and a load are connected, each of the plurality of switching units switching ON/OFF of a connection of a battery pack to the bus;
a plurality of battery packs individually connected to each of the plurality of switching units, each of the plurality of battery packs being identical to the battery pack; and
a management unit which manages the plurality of switching units such that the plurality of battery packs are alternately discharged so that a discharging rate of each of the plurality of battery packs is increased compared to when all of the plurality of battery packs are discharged, wherein
some of the plurality of switching units comprise a discharging FET and a charging FET which are able to switch between a discharging state in which current flows from the battery pack connected thereto to the bus, a charging state in which the current flows from the bus to the battery pack, and a shut-off state in which the current does not flow between the bus and the battery pack, and rest of the plurality of switching units comprise a contactor connected to the bus, and the discharging FET and the charging FET connected in series between the contactor and the battery pack, and
the management unit maintains the contactor of the rest of the plurality of switching units in an OFF state while the system is located in an area where lightning is generated.

11. The system according to claim 10, wherein
the system is installed in a flying object,
the plurality of battery packs are arranged in a wing portion of the flying object,
the power generation unit performs solar power generation, and
the load is a motor which rotates a propeller of the flying object.

12. A system comprising:
a plurality of switching units connected in parallel to a bus to which a power generation unit and a load are connected, each of the plurality of switching units switching ON/OFF of a connection of a battery pack to the bus;
a plurality of battery packs individually connected to each of the plurality of switching units, each of the plurality of battery packs being identical to the battery pack; and
a management unit which manages the plurality of switching units such that the plurality of battery packs are alternately discharged so that a discharging rate of each of the plurality of battery packs is increased compared to when all of the plurality of battery packs are discharged, wherein
some of the plurality of switching units comprise a discharging FET and a charging FET connected in series which are able to switch between a discharging state in which current flows from the battery pack connected thereto to the bus, and a charging state in which the current flows from the bus to the battery pack, and a shut-off state in which the current does not flow between the bus and the battery pack, and rest of the plurality of switching units comprise a contactor which switches ON/OFF of the current between the battery pack connected thereto and the bus.

13. The system according to claim 12, wherein
the management unit turns the some of the plurality of switching units into the charging state and turns on the contactor of the rest of the plurality of switching units during charging, and turns on the contactor of the rest of the plurality of switching units and turns the some of the plurality of switching units into the discharging state alternately during discharging.

14. The system according to claim 13, wherein
the management unit turns the some of the plurality of switching units into the discharging state alternately so that all of the switching units do not turn into the discharging state simultaneously during the discharging.

15. The system according to claim 12, wherein
the system is installed in a flying object,
the plurality of battery packs are arranged in a wing portion of the flying object,
the power generation unit performs solar power generation, and
the load is a motor which rotates a propeller of the flying object.

16. A system comprising:
a plurality of switching units connected in parallel to a bus to which a power generation unit and a load are connected, each of the plurality of switching units switching ON/OFF of a connection of a battery pack to the bus;
a plurality of battery packs individually connected to each of the plurality of switching units, each of the plurality of battery packs being identical to the battery pack; and
a management unit which manages the plurality of switching units such that the plurality of battery packs are alternately discharged so that a discharging rate of each of the plurality of battery packs is increased compared to when all of the plurality of battery packs are discharged, wherein
all of the plurality of switching units each comprise a contactor connected to the bus, and a discharging FET and a charging FET connected in series between the contactor and the battery pack, and when the contactor is in an ON-state, the discharging FET and the charging FET are able to switch between a discharging state in which current flows from the battery pack connected thereto to the bus, a charging state in which the current flows from the bus to the battery pack, and a shut-off state in which the current does not flow between the bus and the battery pack.

17. The system according to claim 16, wherein
the management unit maintains the contactor of each of some switching units among the plurality of switching units in an OFF state while a predetermined condition is being met.

18. The system according to claim 17, wherein
the management unit only turns on the contactor of each of the some switching units among the plurality of switching units and maintains the contactor of each of remaining switching units among the plurality of switching units in the OFF state, while the system is located in an area where lightning is generated.

19. The system according to claim 18, wherein
the contactor of each of the plurality of switching units is of a type which turns off when control current is applied, and
the management unit applies the control current to the contactor of the remaining switching units among the plurality of switching units while the system is located in the area where the lightning is generated.

20. A system comprising:
a plurality of switching units connected in parallel to a bus to which a power generation unit and load are connected, each of the plurality of switching units switching ON/OFF of a connection of a battery pack to the bus;
a plurality of battery packs individually connected to each of the plurality of switching units, each of the plurality of battery packs being identical to the battery pack; and
a management unit which manages the plurality of switching units such that the plurality of battery packs are alternately discharged so that a discharging rate of each of the plurality of battery packs is increased compared to when all of the plurality of battery packs are discharged, wherein
at least any one of the plurality of switching units comprises a discharging FET and a charging FET which are able to switch between a discharging state in which current flows from the battery pack connected thereto to the bus, a charging state in which the current flows from the bus to the battery pack, and a shut-off state in which the current does not flow between the bus and the battery pack, and
the management unit controls the plurality of switching units to alternately discharge the plurality of battery packs so that a difference in voltage between the battery pack with a highest voltage and the battery pack with a lowest voltage among the plurality of battery packs does not exceed a voltage threshold.

* * * * *